US012566108B2

(12) United States Patent
Miller et al.

(10) Patent No.: US 12,566,108 B2
(45) Date of Patent: Mar. 3, 2026

(54) METHODS AND APPARATUS TO DETERMINE ENGINE STATUS WITH PLENUM MEASUREMENTS

(71) Applicant: General Electric Company, Schenectady, NY (US)

(72) Inventors: Brandon W. Miller, Middletown, OH (US); Andrew J. Hank, Maineville, OH (US); John C. Schilling, Sharonville, OH (US); Ryan T. Roehm, West Chester, OH (US); Kevin Graziano, Liberty Township, OH (US); Geoffrey Whitener, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 84 days.

(21) Appl. No.: 18/329,156

(22) Filed: Jun. 5, 2023

(65) Prior Publication Data

US 2024/0402048 A1     Dec. 5, 2024

(51) Int. Cl.
| | |
|---|---|
| *F01D 21/00* | (2006.01) |
| *F01D 25/08* | (2006.01) |
| *F01D 25/12* | (2006.01) |
| *F02C 7/18* | (2006.01) |
| *G01M 15/14* | (2006.01) |

(52) U.S. Cl.
CPC ........... *G01M 15/14* (2013.01); *F01D 21/003* (2013.01); *F01D 25/08* (2013.01); *F01D 25/12* (2013.01); *F02C 7/18* (2013.01); *F05D 2220/32* (2013.01); *F05D 2260/83* (2013.01)

(58) Field of Classification Search
CPC ........ F01D 21/003; F01D 25/08; F01D 25/12; G01M 15/14; F05D 2220/32; F05D 2260/83
See application file for complete search history.

(56) References Cited

U.S. PATENT DOCUMENTS

| | | | |
|---|---|---|---|
| 2,864,393 | A | 12/1958 | Drake |
| 5,372,032 | A | 12/1994 | Filippi et al. |
| 7,536,865 | B2 | 5/2009 | Mikhail |

(Continued)

FOREIGN PATENT DOCUMENTS

| | | |
|---|---|---|
| CN | 209182029 U | 7/2019 |
| FR | 2425665 A1 | 12/1979 |
| FR | 3097963 A1 | 1/2021 |

*Primary Examiner* — Nathaniel E Wiehe
*Assistant Examiner* — Theodore C Ribadeneyra
(74) *Attorney, Agent, or Firm* — McCarter & English LLP

(57) ABSTRACT

Methods and apparatus to determine engine status with plenum measurements are disclosed. A disclosed example apparatus for use with a gas turbine engine having bleed offtakes includes at least one sensor on or within the gas turbine engine, the at least one sensor to measure at least one parameter corresponding to: a first plenum within a casing of the gas turbine engine, the first plenum positioned at or downstream of a volume at which flows from respective ones of the bleed offtakes are combined, and a second plenum within the casing, the second plenum positioned upstream of the first plenum, and an interface to communicatively couple the at least one sensor to a controller, the controller to determine a status of the bleed offtakes based on the at least one parameter.

17 Claims, 21 Drawing Sheets

(56)     References Cited

U.S. PATENT DOCUMENTS

| | | | |
|---|---|---|---|
| 8,516,826 B2 | 8/2013 | Rostek et al. | |
| 8,677,761 B2 | 3/2014 | Leach et al. | |
| 8,696,196 B2 | 4/2014 | Monteiro | |
| 9,097,182 B2 | 8/2015 | Chillar et al. | |
| 9,823,154 B2 | 11/2017 | Norris | |
| 10,196,928 B2 | 2/2019 | Adibhatla et al. | |
| 11,578,668 B2 * | 2/2023 | Ortiz et al. | |
| 2005/0111964 A1 * | 5/2005 | Krammer | F01D 5/082 |
| | | | 415/115 |
| 2011/0072827 A1 * | 3/2011 | Ciofini | F02C 7/18 |
| | | | 60/772 |
| 2014/0309846 A1 | 10/2014 | Howard | |
| 2018/0334965 A1 | 11/2018 | Ortiz et al. | |
| 2022/0319342 A1 | 10/2022 | Larminier | |

* cited by examiner

STATUS CONTROLLER

700

704

702

1400

1402　Ps, A

1404　MODEL

1406　CALCULATE SENSOR TO MODEL DELTA
(dPs, A) = Abs[(Ps, A)−(Ps, Model)]

1408　AS DELTA EXCEEDS A THRESHOLD, SET A FAULT.
FAULT = (dPs, A)>THRESHOLD

1500

MODEL INFORMATION

1502　ENGINE PARAMETER(S)

1503　SPEED

1504　BACK CALCULATE PRESSURE AT SOURCE STAGE
(FUNCTIONAL OF INDIVIDUAL COMPRESSOR STAGE,
COMPRESSION RATIO & LOSSES)

1506　SOURCE MODEL

1508　LOSSES BETWEEN SOURCE AND SINK

1510　SINK MODEL

METHODS AND APPARATUS TO DETERMINE ENGINE STATUS WITH PLENUM MEASUREMENTS

FIELD OF THE DISCLOSURE

This disclosure relates generally to aircraft engines and, more particularly, to methods and apparatus to determine engine status with plenum measurements.

BACKGROUND

Turbofan engines, such as those used on aircraft, generally include a fan, a gas turbine engine to drive the fan, and an outer bypass duct. The gas turbine engine includes one or more compressor(s), a combustor, and one or more turbine(s) in a serial flow arrangement. Some gas turbine engines extract high pressure air from one of the compressor(s), known as "bleed air." This bleed air is routed to the turbine(s) for cooling the turbine(s).

BRIEF DESCRIPTION OF THE DRAWINGS

A full and enabling disclosure of the presently described technology, including the best mode thereof, directed to one of ordinary skill in the art, is set forth in the specification, which makes reference to the appended FIGS., in which.

Figure 1:
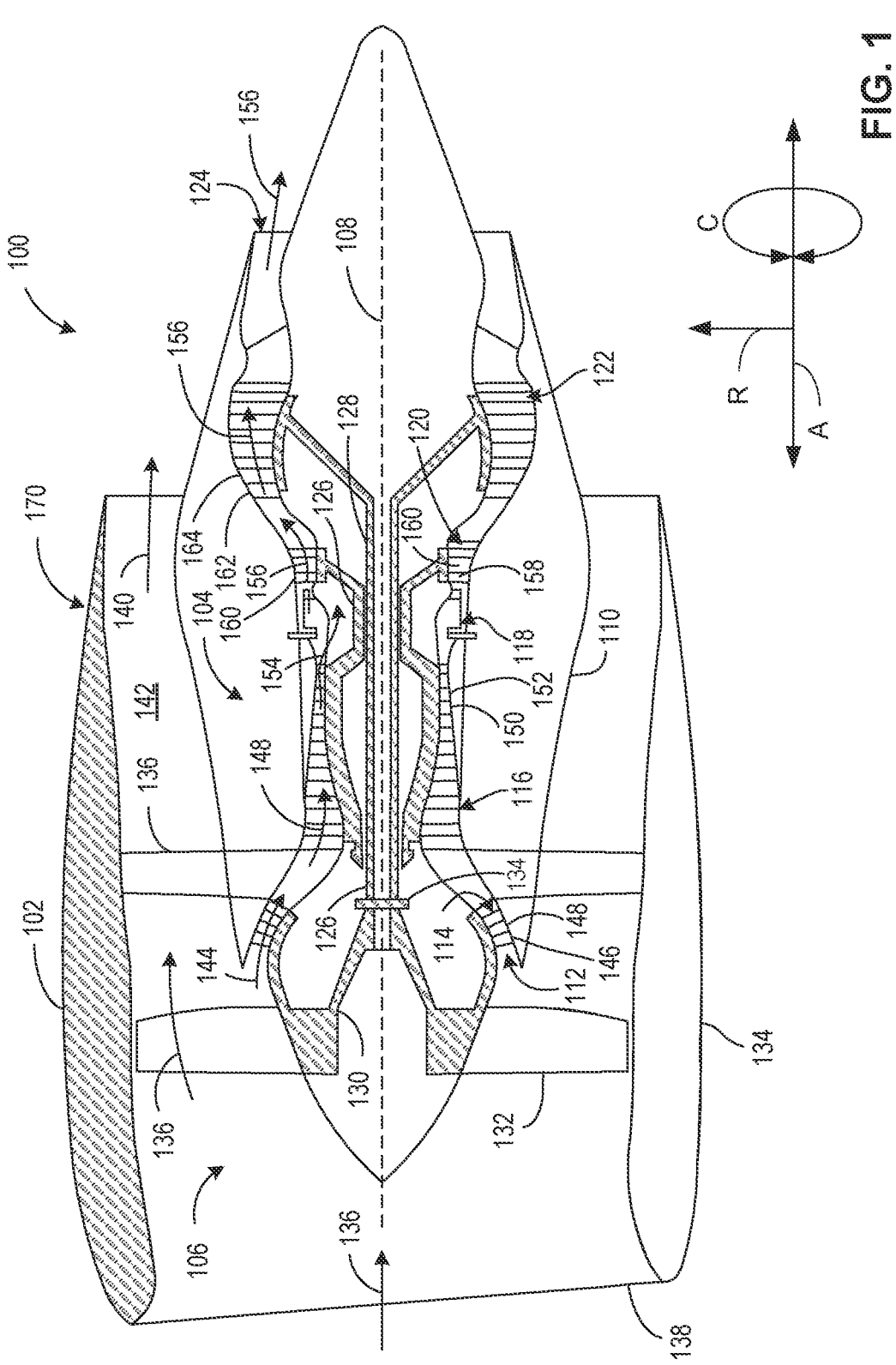
FIG. 1 is a schematic cross-sectional view of an example turbofan engine in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. As used herein, the terms "plenum" and "annular plenum" refer to an internal flow combining volume that can be defined by a structure, components, a pressure vessel, a seal, a volume at least partially sealed, an assembly and/or flow devices, etc. As used herein, the term "sink" refers to a portion, a position and/or a section of an engine at or downstream from a region to which flow from bleed offtakes are returned and combined. As used herein, the term "source" refers to a portion, a position and/or a section of an engine that is upstream of the sink and can be upstream or downstream from the aforementioned region from which flow from the bleed offtakes is returned. As used herein, stating that an output or parameter is "measured at" a position means that the output or parameter is measured at the position whether a sensor is located at the position or at a distance from the position.

DETAILED DESCRIPTION

Methods and apparatus to determine engine status with plenum measurements are disclosed. Turbofan engines, such as those used on aircraft, include a gas turbine engine. A gas turbine engine includes a compressor, a combustor, and a turbine in a serial flow arrangement. The gas turbine engine includes a shaft that operably couples the turbine and the compressor, such that the turbine drives the compressor during operation of the gas turbine engine. In some instances, the gas turbine engine is designed to extract some of the high pressure air from the compressor. This extracted air is typically referred to as "bleed air." The bleed air is routed to the turbine for cooling the turbine, which improves efficiency of the gas turbine engine.

To extract this bleed air from the compressor, a section of the shaft in the compressor has an opening (sometimes referred to as a bleed opening or port). A portion of the high pressure air in the compressor flows through the opening and into an inner passageway of the shaft. The inner passageway (and one or more channels or tubes) known as a bleed offtake directs the airflow downstream to the turbine for cooling the turbine. For example, the airflow can be used for cooling the turbine blades and rotating disks for cyclic life and for hardware durability (both static and rotating). This improves blade tip clearance, which yields improved efficiency (compression and/or work extraction). Additionally or alternatively, the air can be used for services such as sump pressurization, sump cooling, fuel systems, and/or systems managing external valves, pumps, gear boxes, Full Authority Digital Engine Control (FADEC) computers, etc. Some known systems utilize sensors on individual pipes corresponding to bleed outtakes. However, bleed offtakes that supply the cooled airflow can be susceptible to damage and/or incorrect operation. Additionally, mounting the sensors to each of the pipes can result in relatively high costs. Further, replacement, service and maintenance of the sensors can result in significant downtime of the gas turbine engine. While replaceable, these sensors can be subject to wear and/or malfunction that can lead to false data and/or incorrect determinations of an engine status and/or health. Further, these sensors can add significant weight to the engine and, thus, an aircraft in an overall sense.

Examples disclosed herein are cost-effective and can improve diagnostic and/or status determination capabilities corresponding to bleed airflow or bleed air in gas turbine engines. Further, examples disclosed herein can reduce a frequency of necessitated service and/or maintenance. In particular, examples disclosed herein can effectively determine an operational status of bleed offtakes (e.g., bleed offtake pipes) that may extend from ports of a compressor to a plenum of a turbine for cooling thereof or other appropriate engine health indicator and/or parameter. Examples disclosed herein can effectively determine a presence of ingestion, as well as other health status indicators of the gas turbine engine. Examples disclosed herein can also be effective in detecting latent or hidden failures that might be difficult to detect (e.g., undetectable until takeoff or a flight phase).

Examples utilize internal sensing of a gas turbine engine to determine a health status of the gas turbine engine, such as a status of bleed offtakes of the gas turbine engine. According to examples disclosed herein, a first parameter (e.g., a temperature, a pressure, a temperature or pressure differential, etc.) is measured at a first plenum of a downstream position and a second parameter (e.g., a temperature, a pressure, a temperature or pressure differential, etc.) is measured at a second plenum of an upstream position. Additionally or alternatively, a differential parameter (e.g., a differential temperature, a differential pressure, etc.) between the downstream position and the upstream position (or vice-versa) is utilized to determine the health status. For example, a difference in pressure and/or temperature between the first and second plenums can indicate whether bleed offtakes of the gas turbine engine and/or sensors associated with the bleed offtakes are operating within normal parameters. Particularly, the difference in pressure and/or temperature between the first and second plenums can correspond to a threshold difference or a difference range corresponding to normal operation of the bleed offtakes and/or the gas turbine engine.

In some examples, the upstream position is located at or proximate intakes of the bleed offtakes. The upstream position can be positioned from upstream of the intakes of the bleed offtakes or downstream from a volume at which flow from the bleed offtakes is recombined and, thus, defines a recombined volume. In some examples, the upstream position is between the intakes of the bleed offtakes and the aforementioned recombined volume. According to examples disclosed herein, the downstream position is located at or proximate the volume at which the flow from the bleed offtakes is recombined. In some examples, the upstream position is adjacent the downstream position (e.g., separated by a wall or an orifice). In some examples, tubes are utilized to fluidly couple at least one sensor positioned at an exterior of the gas turbine engine with an internal plenum of the gas turbine engine.

Referring now to the drawings, FIG. 1 is a schematic cross-sectional view of an example turbo engine 100 that can incorporate various examples disclosed herein. The example turbo engine 100 can be implemented on an aircraft and therefore referred to as an aircraft engine. In this example, the turbo engine 100 is a turbofan-type of engine. However, the principles of the present disclosure are also applicable to other types of engines, such as turboprop engines or unducted fan (UDF) engines (sometimes referred to as propfans). Further, the example principles disclosed herein can be implemented on other types of engines, such as non-aircraft engines.

As shown in FIG. 1, the turbo engine 100 includes an outer bypass duct 102 (which may also be referred to as a nacelle, or fan duct, etc.), a gas turbine engine 104 (which may also be referred to as a core turbine engine), and a fan section 106. The gas turbine engine 104 and the fan section 106 are disposed at least partially in the outer bypass duct 102. The gas turbine engine 104 is disposed downstream from the fan section 106 and drives the fan section 106 to produce forward thrust. As shown in FIG. 1, the turbo engine 100 and/or the gas turbine engine 104 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turbo engine 100, such as to the left in FIG. 1, while the term "rearward" refers to a direction along the centerline axis 108 in the opposite direction, such as to the right in FIG. 1.

The gas turbine engine 104 includes a substantially tubular outer casing 110 (which may also be referred to as a mid-casing) that defines an annular inlet 112. The outer casing 110 of the gas turbine engine 104 can be formed from a single casing or a plurality of casings. The outer casing 110 encloses, in serial flow relationship, a compressor section having a booster or low pressure compressor (LPC) 114 and a high pressure compressor (HPC) 116, a combustion section 118 (which may also be referred to as a combustor), a turbine section having a high pressure turbine (HPT) 120 and a low pressure turbine (LPT) 122, and an exhaust section 124. The gas turbine engine 104 includes a high pressure (HP) shaft 126 that drivingly couples the HPT 120 and the HPC 116. The gas turbine engine 104 also includes a low pressure (LP) shaft 128 that drivingly couples the LPT 122 and the LPC 114. The LP shaft 128 also couples to a fan shaft 130. The fan section 106 includes a plurality of fan blades 132 that are coupled to and extend radially outward from the fan shaft 130. In some examples, the LP shaft 128 may couple directly to the fan shaft 130 (e.g., a direct-drive configuration). In alternative configurations, the LP shaft 128 may couple to the fan shaft 130 via a reduction gear 134 (e.g., an indirect-drive or geared-drive configuration). While in this example the gas turbine engine 104 includes two compressor and two turbines, in other examples, the gas turbine engine 104 may only include one compressor and one turbine.

As illustrated in FIG. 1, during operation of the turbo engine 100, air 136 enters an inlet portion 138 of the turbo engine 100. The air 136 is accelerated by the fan blades 132 (sometimes considered a low-pressure compressor). A first portion 140 of the air 136 flows into a bypass airflow passage 142, while a second portion 144 of the air 136 flows into the annular inlet 112 of the gas turbine engine 104 (and, thus, into the LPC 114). One or more sequential stages of LP compressor stator vanes 146 and LP compressor rotor blades 148 coupled to the LP shaft 128 progressively compress the second portion 144 of the air 136 flowing through the LPC 114 en route to the HPC 116. Next, one or more sequential stages of HPC stator vanes 150 and HPC rotor vanes 152 coupled to the HP shaft 126 further compress the second portion 144 of the air 136 flowing through the HPC 116. This provides compressed air 154 to the combustion section 118 where it mixes with fuel and burns to provide combustion gases 156.

The combustion gases 156 flow through the HPT 120 where one or more sequential stages of HP turbine stator vanes 158 and HPT rotor blades 160 coupled to the HP shaft 126 extract a first portion of kinetic and/or thermal energy. This energy extraction supports operation of the HPC 116. The combustion gases 156 then flow through the LPT 122 where one or more sequential stages of LPT stator vanes 162 and LPT rotor blades 164 coupled to the LP shaft 128 extract a second portion of thermal and/or kinetic energy therefrom. This energy extraction causes the LP shaft 128 to rotate, which supports operation of the LPC 114 and/or rotation of the fan shaft 130. The combustion gases 156 then exit the gas turbine engine 104 through the exhaust section 124 thereof. The combustion gases 156 mix with the first portion 140 of the air 136 from the bypass airflow passage 142. The combined gases exit an exhaust nozzle 170 (e.g., a converging/diverging nozzle) of the bypass airflow passage 142 to produce propulsive thrust.

Figure 2:
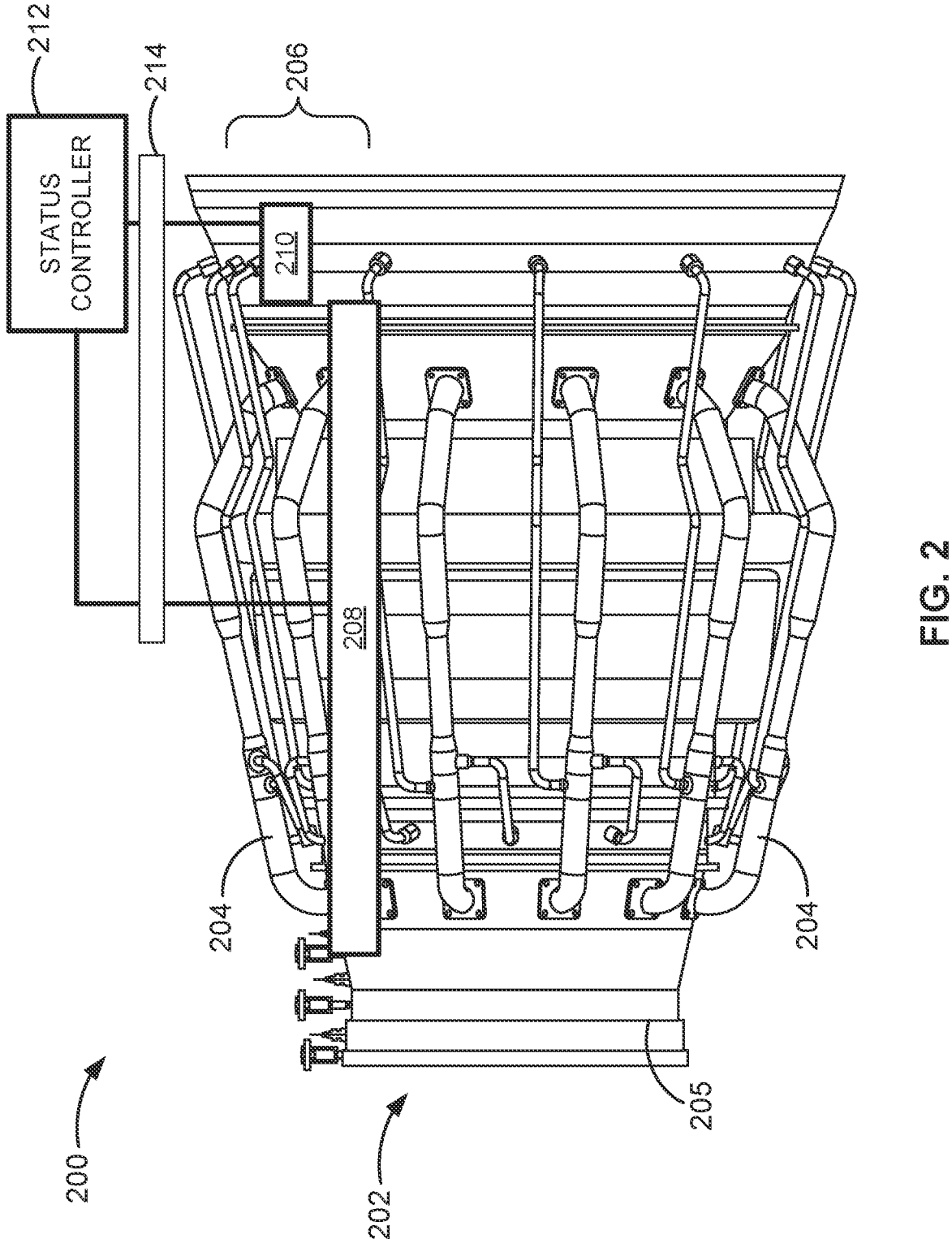
FIG. 2 is a schematic overview of an example engine status determination system in accordance with teachings of this disclosure.

FIG. 2 is a schematic overview of an example engine status determination system 200 in accordance with the present disclosure. The engine status determination system 200 of the illustrated example is shown with an inner portion 202 of the gas turbine engine 104 of FIG. 1. Particularly, the gas turbine engine 104 of FIG. 1 is shown with the outer casing 110 removed for clarity. In this example, bleed offtakes (e.g., bleed offtake pipes, bleed offtake channels, etc.) 204 extend away from (e.g., diametrically away from and along a direction of travel/flow) a periphery of a body (e.g., an inner casing, a shroud, a housing, etc.) 205, which can be part of, disposed within, surrounded by and/or enclosed within the outer casing 110 shown in FIG. 1. The example engine status determination system 200 includes a sensing system 206 which, in turn, includes and/or utilizes one or more sensors, as will be discussed in greater detail below in conjunction with FIGS. 3-20. In this example, the sensing system 206 corresponds to a source 208, as well as a sink 210. According to examples disclosed herein, the sink 210 can correspond to any position at or downstream from a volume at which flow from the bleed offtakes 204 is returned into the gas turbine engine 104 and recombined. In turn, the source 208 can be at any position upstream of the sink 210 (e.g., directly adjacent to the sink 210, separated from the sink 210 by a distance, etc.). In some examples, the source 208 can be at a position corresponding to where flow is provided to inlets of the bleed offtakes or downstream from the volume at which flow from the bleed offtakes are returned to the gas turbine engine 104 (or any position in between). In this example, an example status controller 212, which may be integral or external to the gas turbine engine 104, is communicatively coupled to the aforementioned sensing system 206 via an interface 214 (e.g., a sensor interface), which may include circuitry and/or wiring.

In operation, the example bleed offtakes 204 route and/or direct air from an upstream portion (e.g., the compressor section of FIG. 1 including the LPC 114 and/or the HPC 116) of the gas turbine engine 104 to a downstream/aft portion (e.g., the turbine section, the combustion section 118) of the gas turbine engine 104 such that flow from each of the bleed offtakes 204 is combined (e.g., recombined). As a result, the downstream/aft portion of the gas turbine engine 104 corresponding to the turbine section and/or the combustion section 118 shown in FIG. 1 is cooled (e.g., the HPT 120, the LPT 122). Additionally or alternatively, the flow exiting the bleed offtakes 204 can be recombined prior to flowing into the combustion section 118.

To determine a status of the turbo engine 100, the gas turbine engine 104 and/or the bleed offtakes 204 (or other related systems/components), the example status controller 212 utilizes internal measurements (e.g., sensor information, sensor output) from at least one sensor corresponding to the source 208 and/or the sink 210. In particular, the example status controller 212 can be utilized to determine whether one or more of the bleed offtakes 204 is leaking, disconnected, malfunctioning, incorrectly installed, etc., or if one of the sensors associated with the bleed offtakes 204 is malfunctioning. According to examples disclosed herein, at least one sensor is placed in an internal volume or remotely measures air within the internal volume (e.g., via a sensing line/tube). In contrast to known systems, sensors on or within a length of the bleed offtakes 204 are not needed, which reduces associated costs, a number of sensors involved, service and labor and also enables a weight reduction. Instead, at least one parameter (e.g., temperatures of the source 208 and the sink 210, pressures of the source 208 and the sink 210, a pressure differential between the source 208 and the sink 210, any combination of pressure, temperature and pressure differential between the source 208 and the sink 210, etc.) that corresponds to an internal volume (e.g., within the body or inner casing 205) of the gas turbine engine 104 is utilized to determine a status of the bleed offtakes 204. In other words, examples disclosed herein utilize internal measurements (e.g., via remote sensors) to determine the status and/or operational condition of the turbo engine 100 and/or the gas turbine engine 104. In some examples, a pressure of the source 208 is averaged with a pressure of the sink 210 to determine an average plenum pressure for determination of the status and/or operational condition of the turbo engine 100 and/or the gas turbine engine 104. In some examples, models are implemented to enable determination of specific parameters based on internal measurements (e.g., a model can be utilized to ascertain or predict a parameter of a first position of the gas turbine engine 104 based on a measured parameter at a second position of the gas turbine engine 104). In some examples, a temperature of the casing 205 or other cover is utilized for determination of the status and/or operational condition of the turbo engine 100 and/or the gas turbine engine 104.

According to examples disclosed herein, areas and/or volumes utilized for measurements and/or sensing can be on any appropriate location and/or plenum of an aircraft engine including, but not limited to, a turbine center frame (TCF), hub box, an HPC offtake plenum, a hub box, an LPT purge cavity, an HPT shroud, an HPT hangar, an at least partially sealed volume defined by a seal (e.g., an annular seal), an orifice and/or an inducer (e.g., an inducer corresponding to an LPT or an HPT). However, measurements can be taken at any other appropriate portion, volume, plenum and/or location of the aircraft engine.

While the example of FIG. 2 is shown and described in the context of determination of bleed offtake status, examples disclosed herein can be applied to any appropriate device, component and/or an overall health (e.g., a health status) of the turbo engine 100 and/or the gas turbine engine 104. To that end, examples disclosed herein can be utilized to determine any appropriate health parameter. Further, examples disclosed herein can be utilized with any appropriate type of engine besides a turbo engine or a gas turbine engine.

Figure 3:
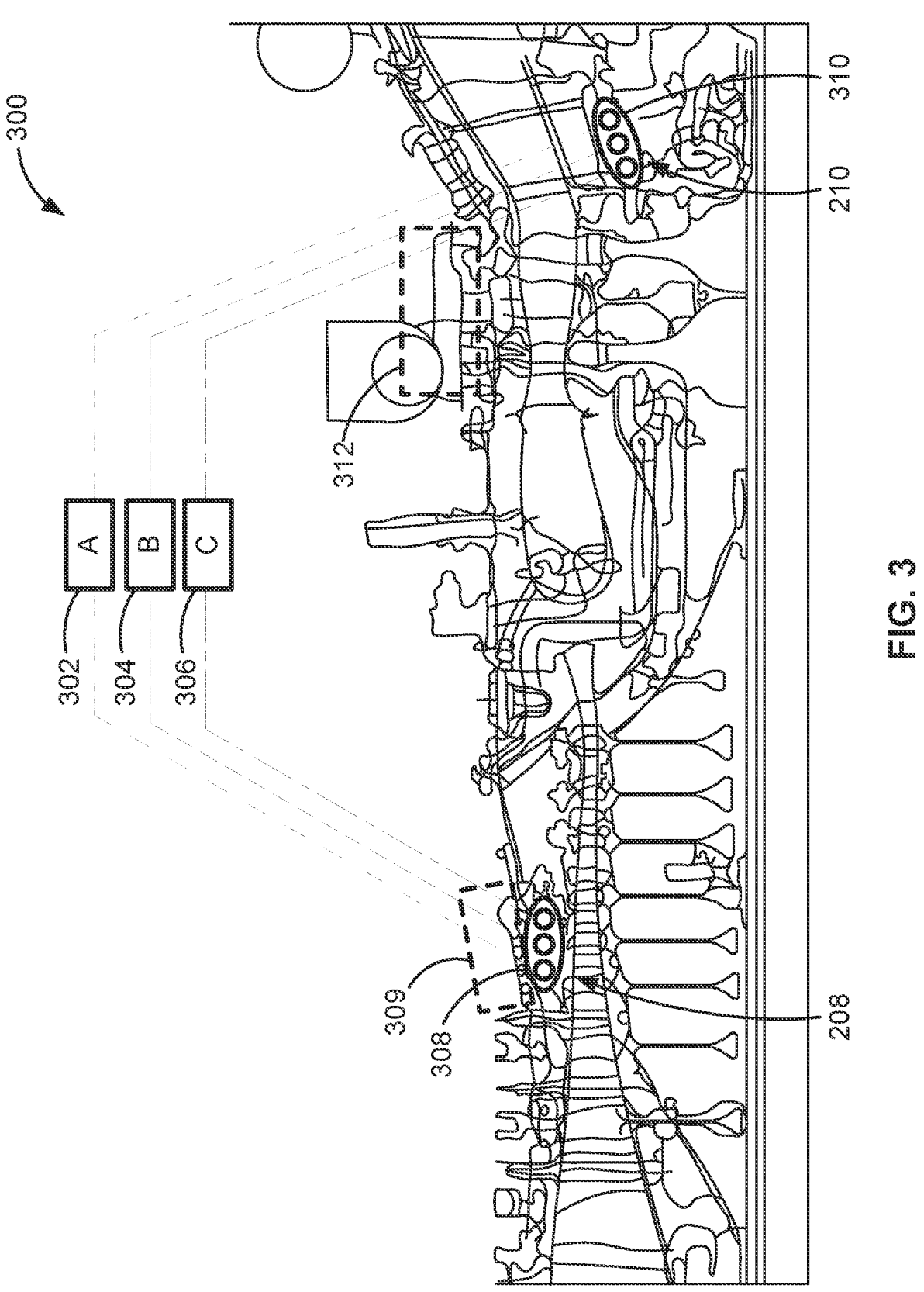
FIG. 3 is a schematic cross-sectional view depicting an example sensing system that can be implemented in examples disclosed herein.

FIG. 3 is a schematic cross-sectional view depicting an example sensing system 300 (e.g., a sensing arrangement, a sensing apparatus, a sensing assembly, a sensor assembly, etc.) that can be implemented in examples disclosed herein. In the illustrated example of FIG. 3, the sensing system 300 includes sensing lines 302, 304, 306 (e.g., remote sensing lines, etc.), designated as "A," "B," and "C, respectively, with a sensor group 308 corresponding to the source 208 that is proximate a bleed offtake manifold 309. Similarly, a sensor group 310 corresponds to the sink 210 and is proximate a bleed offtake manifold 312. Further, the example sensing lines 302, 304, 306 are communicatively coupled to the status controller 212 shown in FIG. 2. In this example, the sensor group 308 and the sensor group 310 each include three absolute pressure sensors disposed within the casing 205 shown in FIG. 2. In particular, the absolute pressure sensors are utilized to measure absolute pressures of plenums of both the source 208 and the sink 210 in a redundant manner (e.g., for consensus decision making). Alternatively, three differential pressure sensors can be utilized for the source 208 and the sink 210 or two absolute pressure sensors associated with each of the source 208 and the sink 210 can be implemented. While six of the absolute pressure sensors (e.g., static or dynamic pressure sensors) are shown and described in the example of FIG. 3, any other appropriate number of sensors can be implemented instead (e.g., one, two, three, four, five, seven, eight, nine, ten, twenty, fifty, one hundred, etc.). Further, according to examples disclosed herein, the aforementioned sensors can measure other parameters including temperature, temperature differentials, pressure differentials, coolant/fluid temperatures, etc. Additionally or alternatively, a combination of at least one absolute pressure and at least one differential pressure sensor can be implemented in examples disclosed herein.

In operation, according to examples disclosed herein, a first pressure is measured by the sensor group 308 at the source 208 and a second pressure is measured by the sensor group 310 at the sink 210. In particular, the first pressure is determined by averaging outputs of individual sensors of the sensor group 308 and, likewise, the second pressure is determined by averaging outputs of individual sensors of the sensor group 310. In turn, a differential between the first and second pressures is utilized to determine whether the bleed offtakes 204 of FIG. 2 and/or the sensors of the sensor groups 308, 310 are operating normally. In particular, the differential can be compared to an expected range and/or a differential threshold for determining an operational status of the bleed offtakes 204.

Figure 4:
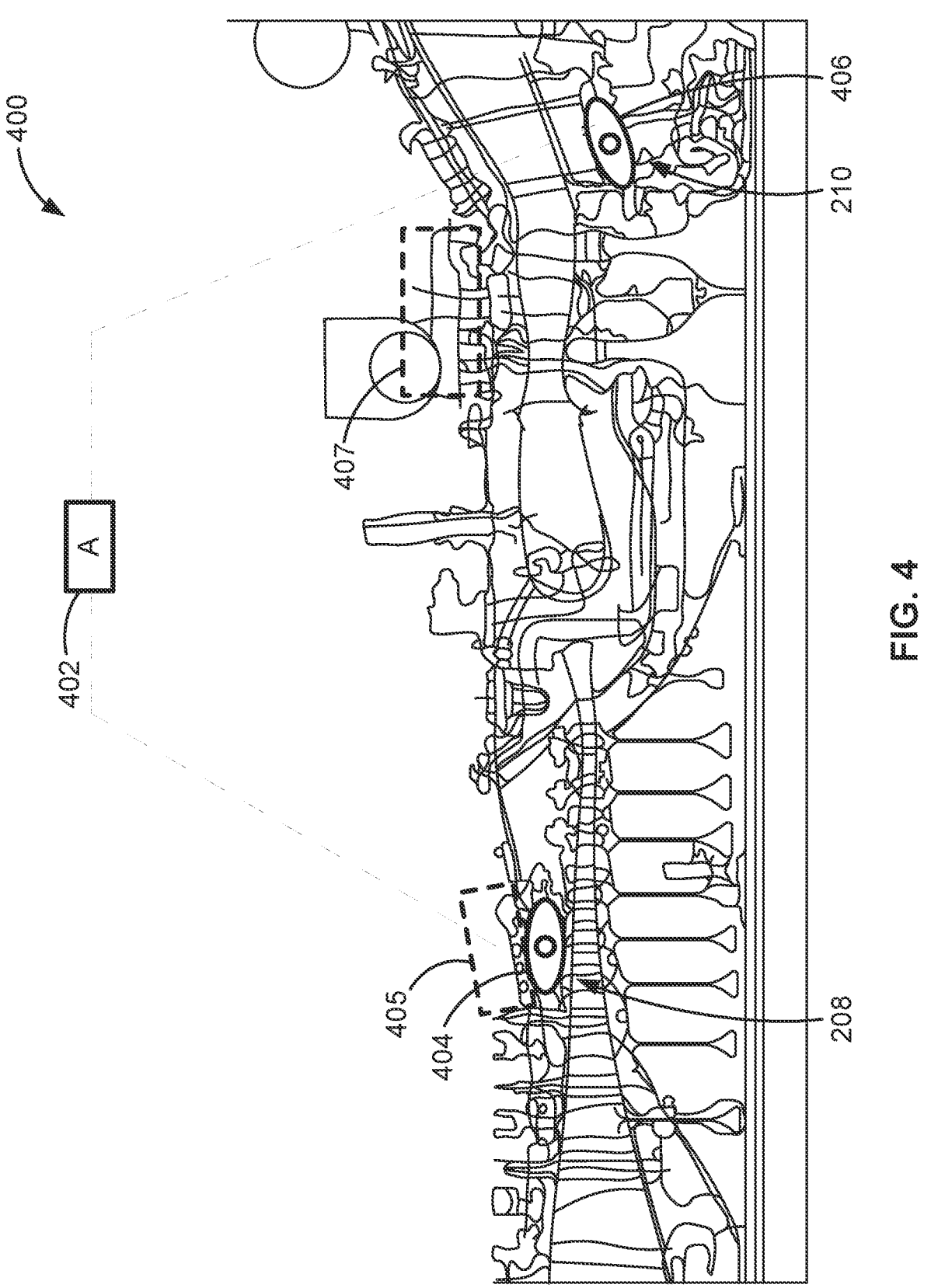
FIG. 4 is a schematic cross-sectional view depicting another example sensing system that can be implemented in examples disclosed herein.

FIG. 4 is a schematic cross-sectional view depicting another example sensing system 400 that can be implemented in examples disclosed herein. In contrast to the example of FIG. 3, only a single sensing line 402 is implemented. In particular, the example sensing line 402 is associated with a first sensor 404 corresponding to the source 208 and a second sensor 406 corresponding to the sink 210. The example first sensor 404 is positioned proximate an outtake manifold 405 to supply the bleed offtakes 204 while the second sensor 406 is positioned proximate a return 407 of the bleed offtakes 204. In this example, the first sensor 404 measures a first pressure downstream from the return 407 and, likewise, the second sensor 406 measures a second pressure downstream from the outtake manifold 405, for example. In other examples, a differential pressure sensor is utilized to determine a pressure differential between the source 208 and the sink 210 (e.g., a pressure differential between a first plenum corresponding to the source 208 and a second plenum corresponding to the sink 210).

In some examples, a model (e.g., a data-based model, a physics-based model, a calculation model, a historical model, a table, etc.) can be utilized by the status controller 212 (shown in FIG. 2) in conjunction with parameters based on output from the first sensor 404. For example, an input, such as a measured engine parameter (e.g., speed, rotor speed, fuel usage, pressure, plenum pressure, temperature, plenum temperature, etc.), provided to the model can result in the model providing an output that can be compared to the parameter and/or output of the first sensor 404 for determination of the status of the gas turbine engine 104. In a particular example, a first pressure in a first part or location of the gas turbine engine 104 is measured and, by the status controller 212 utilizing the model, a second pressure at a second part or location of the gas turbine engine 104 can be calculated and/or predicted. In such examples, the second pressure can be utilized in determining a status of the gas turbine engine 104 (e.g., the second pressure as output from the model is compared to a threshold pressure value to determine the status). In some examples, a differential between the second pressure and the first pressure is utilized to determine the status of the gas turbine engine 104.

Figure 5A:
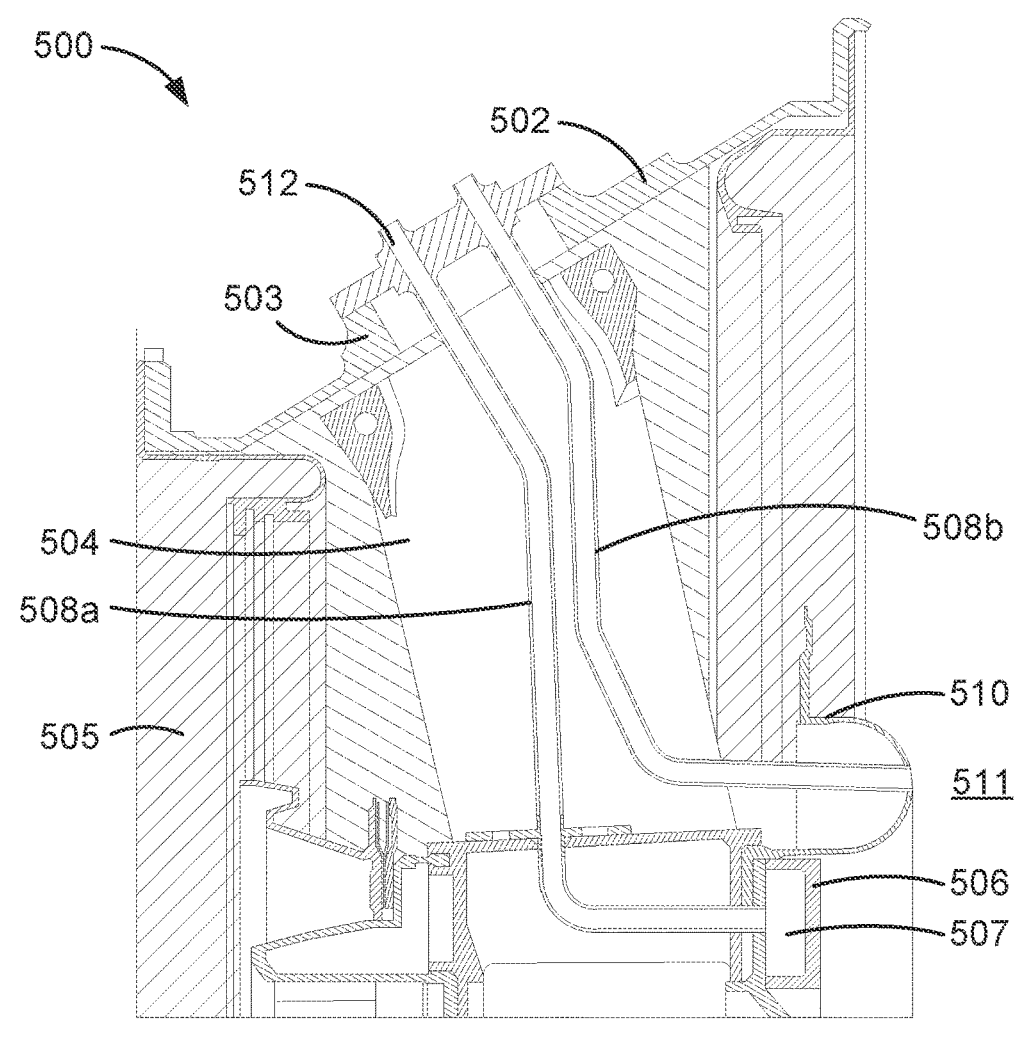
FIG. 5A is a schematic cross-sectional view depicting another alternative example sensing system that can be implemented in examples disclosed herein.

FIG. 5A is a schematic cross-sectional view depicting another alternative example sensing system 500 that can be implemented in examples disclosed herein. In the illustrated example of FIG. 5A, a case 502 (e.g., a turbine frame case) defining a sensor mount 503, a strut 504 (e.g., a radial strut), a rotor seal 505, an inducer 506 that defines a plenum 507 (e.g., an inducer plenum), tubes 508a or lines 508b, a bulkhead seal 510 that at least partially defines a plenum 511, and at least one sensor 512 are depicted.

In the illustrated example of FIG. 5A, a difference (e.g., a pressure differential) between a first pressure (e.g., a first absolute pressure) of the plenum 511 (e.g., a purge cavity static pressure) and second pressure (e.g., a second absolute pressure) of the plenum 507 (e.g., a hub box static pressure) is utilized to determine a status of the gas turbine engine 104. In this particular example, a status of the bleed offtakes 204 is determined based on the difference between the first and second pressures. Utilization of the example tubes 508a and/or lines 508b advantageously enables the at least one sensor 512 to be installed at a distance from the plenums 507, 511 such that the at least one sensor 512 can be placed in a position and/or environment that is user/repair accessible to facilitate service/replacement based on relatively easy access to the example sensor mount 503. Further, utilization of the tubes 508a and/or lines 508b can enable the at least one sensor 512 to be placed and/or positioned in an environment that facilitates a longer life thereof (e.g., a lower temperature environment, an environment with increased airflow, etc.).

In some examples, the at least one sensor 512 includes a differential pressure sensor that measures the pressure difference between the plenum 507 and the plenum 511. According to examples disclosed herein, additional sensors can be employed for redundancy or to ensure a requisite degree of accuracy even if one or more of the sensors malfunctions. In such examples, by utilizing sensor redundancy, sensors that are out of range can be disregarded, and/or ignored. As a result, a need for maintenance, downtime and/or service can be prevented even if one or a few of the sensors are not operating correctly. Additionally or alternatively, output and/or measurements of a plurality of sensors can be weighted. In some such examples, output of different sensors can be weighted based on a degree of similarity between their respective output in comparison to an overall average (e.g., an overall running average) of the sensors.

According to examples disclosed herein, the inducer 506 (or other flow component) is utilized to direct a flow direction of flow moving between sections or portions (e.g., plenums) of the gas turbine engine 104. To that end, the example inducer 506 can include an orifice (e.g., an orifice including or defining vanes) or aperture that may be positioned between and/or separate the plenum 507 and the plenum 511 to impart a substantially tangential flow there-between. In other words, the plenum 507 and the plenum 511 can be separated by a wall, a seal and/or a component defining an orifice or aperture such that the plenum 507 and the plenum 511 are adjacent, for example. However, plenums utilized by examples disclosed herein can be separated by any appropriate distance, walls, chambers or other components. Moreover, plenums utilized by examples disclosed herein can be located at any appropriate structure, cavity, plenum and/or component of an engine. In some other examples, other parameters besides those associated with plenums are utilized instead. For example, engine parameters, such as coolant temperature, plenum temperatures, mass flow rates, plenum conditions, air speed, rotational speeds of shafts and/or turbines, etc. are utilized to determine a status of the gas turbine engine 104.

Figure 5B:
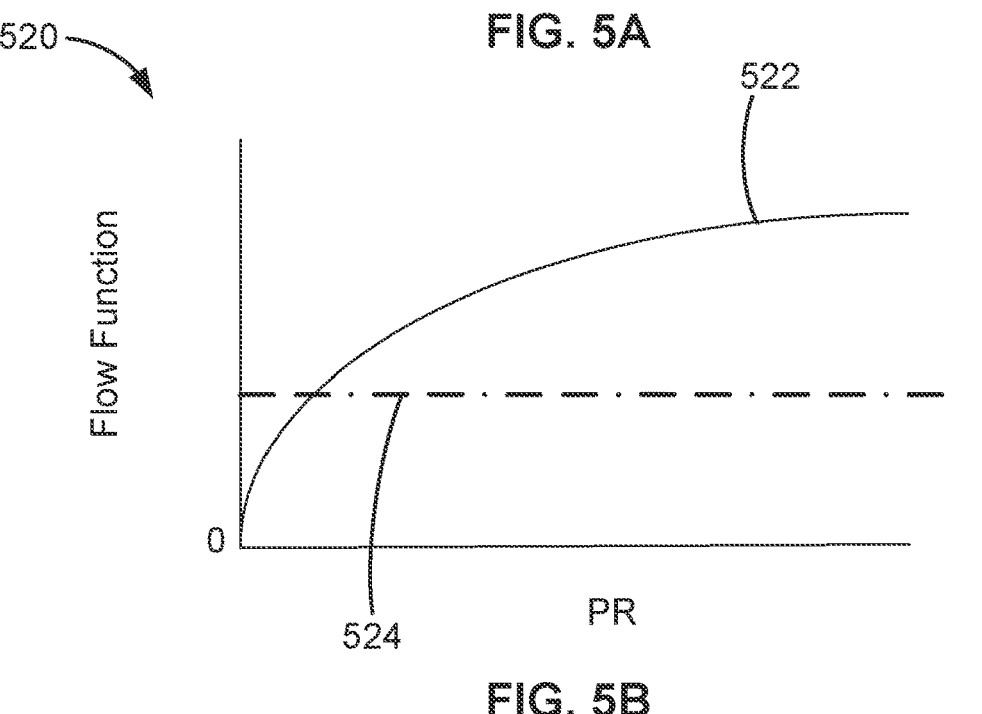
FIG. 5B is a graph illustrating example data that can be utilized in conjunction with the example sensing system of FIG. 5A.

FIG. 5B is a graph 520 illustrating example data that can be utilized in conjunction with the example sensing system 500 of FIG. 5A (or any other appropriate example sensing system and/or sensor arrangement depicted herein). As can be seen in the illustrated view of FIG. 5B, the graph 520 depicts flow function, which is designated as "FF", with respect to a pressure ratio, designated as "PR," of a first pressure of a rotor hub (e.g., a pressure of the plenum 507 shown in FIG. 5A) with respect to a second pressure of a rotor cavity (e.g., a pressure of the plenum 511 shown in FIG. 5A). In this example, a curve 522 corresponds to expected behavior between the first and second pressures. Additionally, a line 524 corresponds to an expected operational range (e.g., a normal operating range, a specified operating range, etc.) such that a deviation of parameters from this portion of the curve 522 can correspond to an indication of improper operation and/or leakage of corresponding ones of the bleed offtakes 204 shown in FIG. 2. In particular, data above the line (in the view of FIG. 5B), corresponds to normal operation. However, any other appropriate criteria and/or metric can be utilized to determine whether the gas turbine engine 104 is operating within normal parameters.

Figure 6:
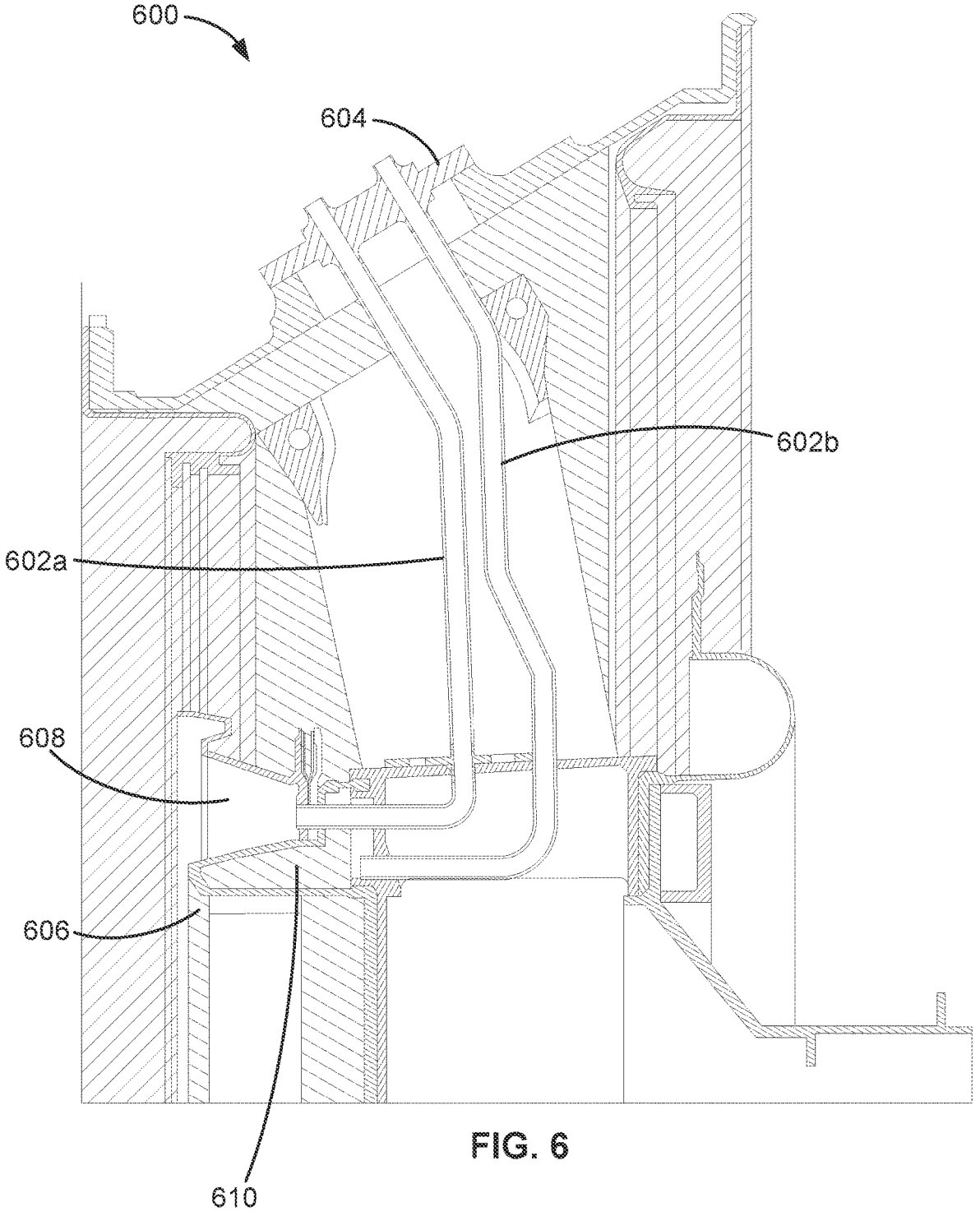
FIG. 6 is a schematic cross-sectional view depicting an alternative example sensing system that can be implemented in examples disclosed herein.

FIG. 6 is a schematic cross-sectional view depicting another alternative example sensing system 600 that can be implemented in examples disclosed herein. The example sensing system 600 is similar to the example sensing system 500 described above in connection with FIGS. 5A and 5B but, instead, utilizes structures and components upstream to those shown in FIG. 5A. In this example, tubes/lines (e.g., remote sensing tubes, remote sensing lines, etc.) 602a, 602b are utilized such that at least one sensor 604 can be placed in an external area and/or surface of the casing 205 that is easily accessible for repair, service, maintenance, etc. (e.g., by removing the outer casing 110). In particular, the tubes/lines 602a, 602b enable internal measurements of the gas turbine engine 104 to be obtained without necessitating placement of the sensor(s) 604 within the casing 205.

In operation, the sensor(s) 604 of the illustrated example measures a pressure difference across a rotor cavity seal 606. In particular, a first pressure (e.g., a first static pressure) of a first plenum 608 is measured and compared to a second pressure (e.g., a second static pressure) of a second plenum 610 that is downstream of the first plenum 608. In this example, a difference between the first pressure and the second pressure is utilized to determine a status and/or condition of the bleed offtakes 204, the turbo engine 100 and/or the gas turbine engine 104.

Figure 7:
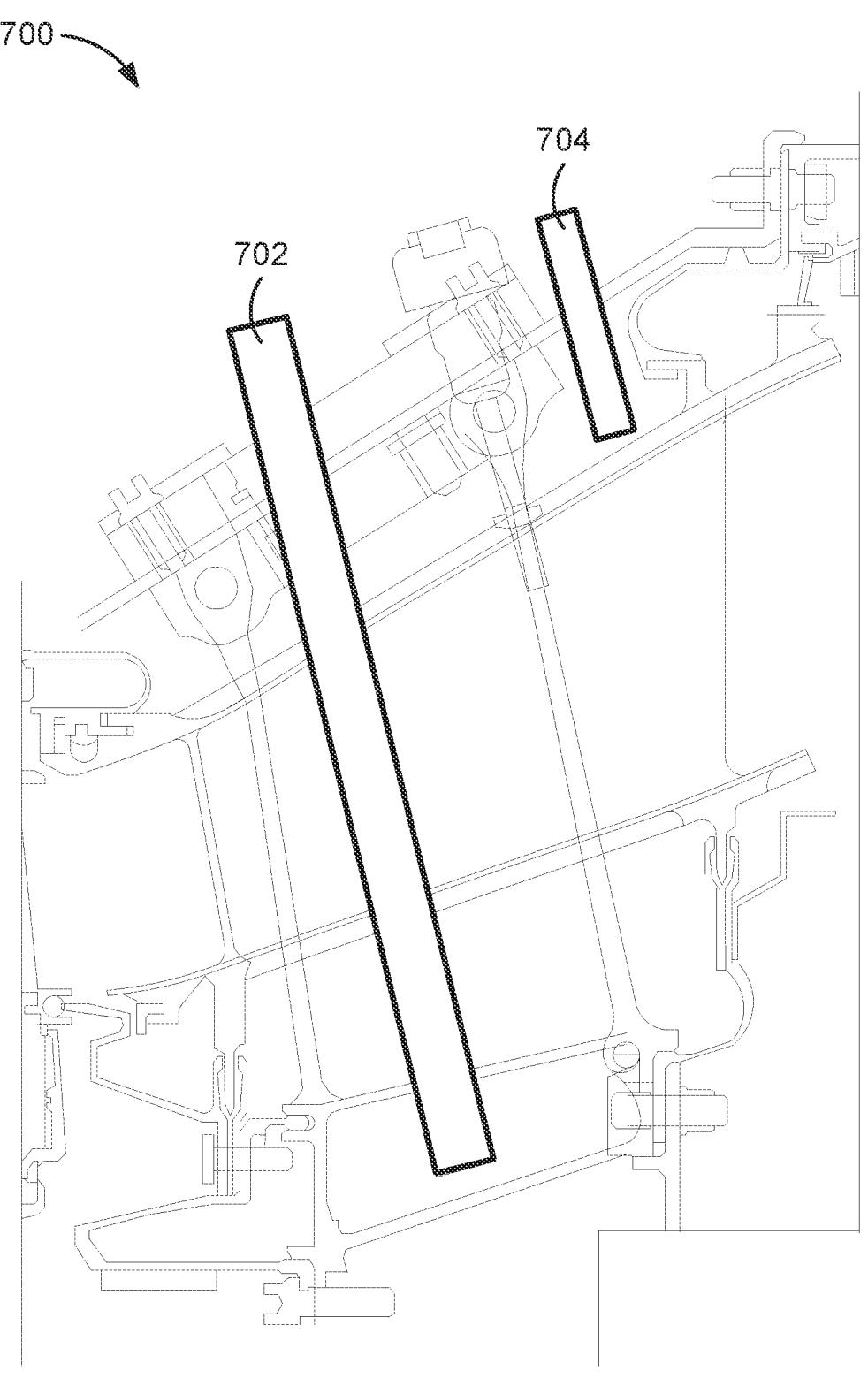
FIG. 7 is a schematic cross-sectional view depicting another alternative example sensing system that can be implemented in examples disclosed herein.

FIG. 7 is a schematic cross-sectional view depicting another alternative example sensing system 700 that can be implemented in examples disclosed herein. In this example, a pressure difference and/or pressure(s) (e.g., static pressure (s), dynamic pressure(s)) are measured at or between a hub box static pressure 702 and an outer flow static pressure 704. As seen in the illustrated example of FIG. 7, examples disclosed herein can utilize exterior/outer flow parameter in addition to internal parameters within the casing 205.

Figure 8:
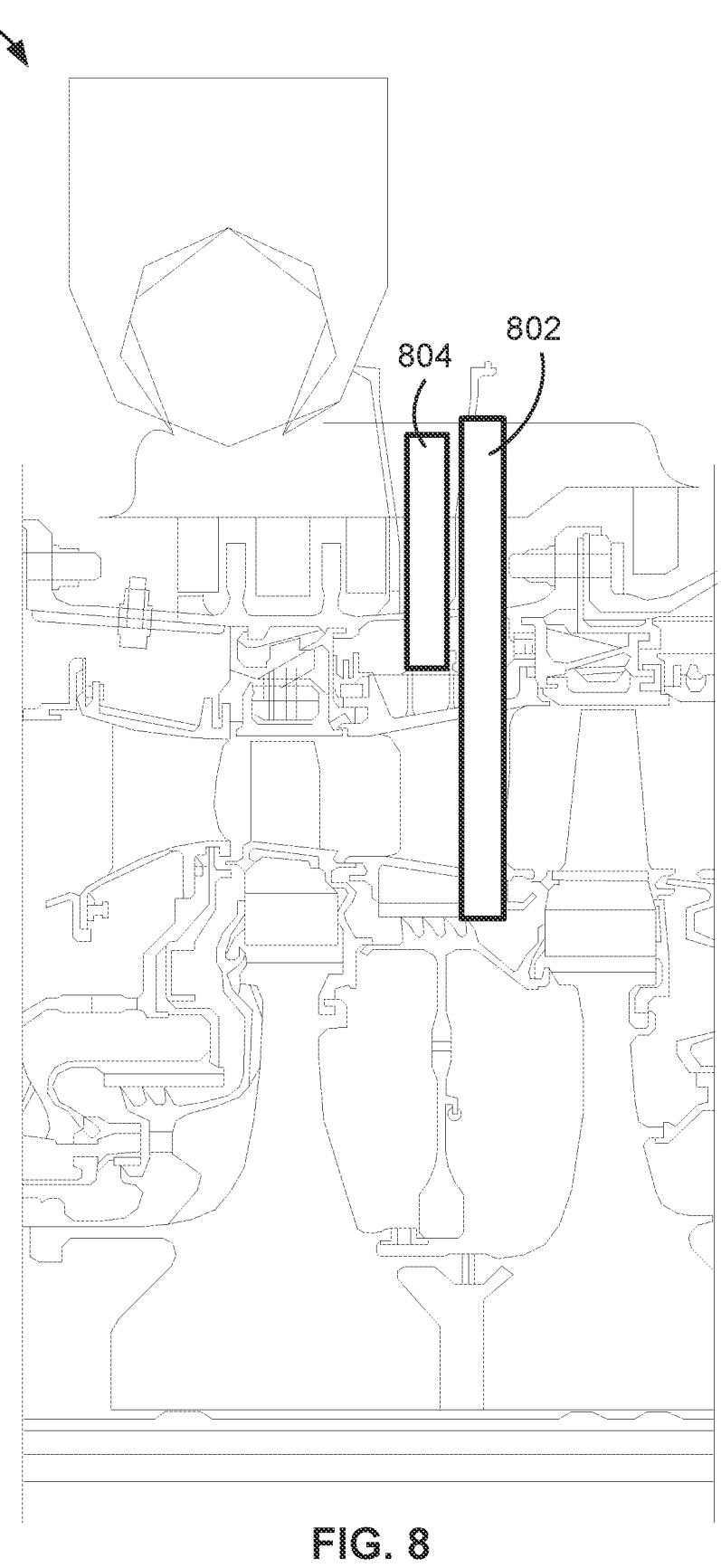
FIG. 8 is a schematic cross-sectional view depicting yet another alternative example sensing system that can be implemented in examples disclosed herein.

FIG. 8 is a schematic cross-sectional view depicting another alternative example sensing system 800 that can be implemented in examples disclosed herein. In the illustrated example of FIG. 8, a pressure difference and/or pressure(s) are measured between a rotor static pressure 802 and an outer flow static pressure 804. As can be seen in the examples of FIGS. 5A-8 (as well as FIGS. 9-11 described below), a multitude of sensing arrangements and positions can be utilized to ascertain an engine health status. To that end, it should be noted that examples disclosed herein can be utilized to determine spline seal health, inner/outer band capability, shroud airflow and secondary flow diagnostics (e.g., outside of the flow path).

Figure 9:
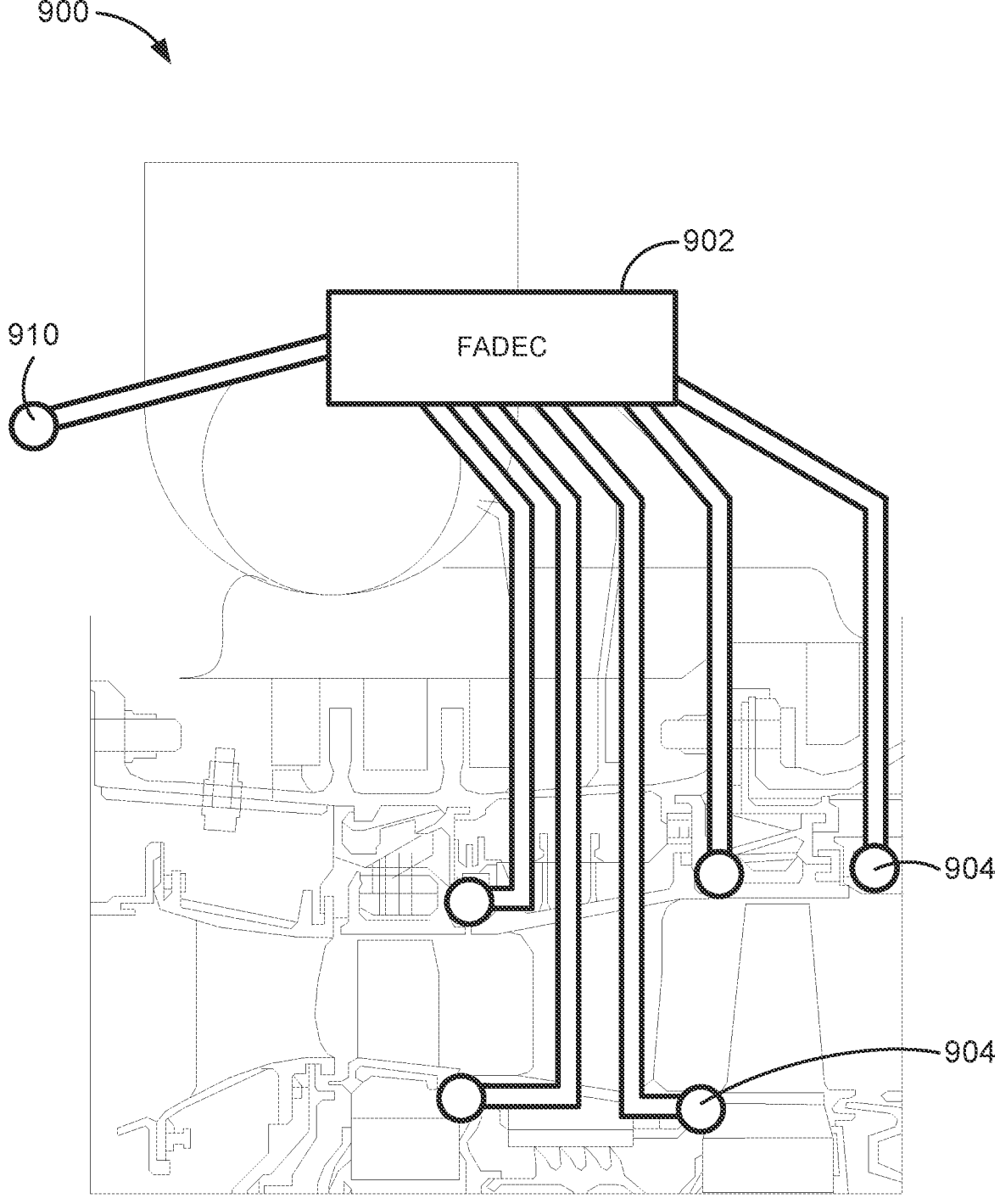
FIGS. 9-11 are schematic cross-sectional views depicting alternative example sensing systems that can be implemented in examples disclosed herein.
Figure 10:
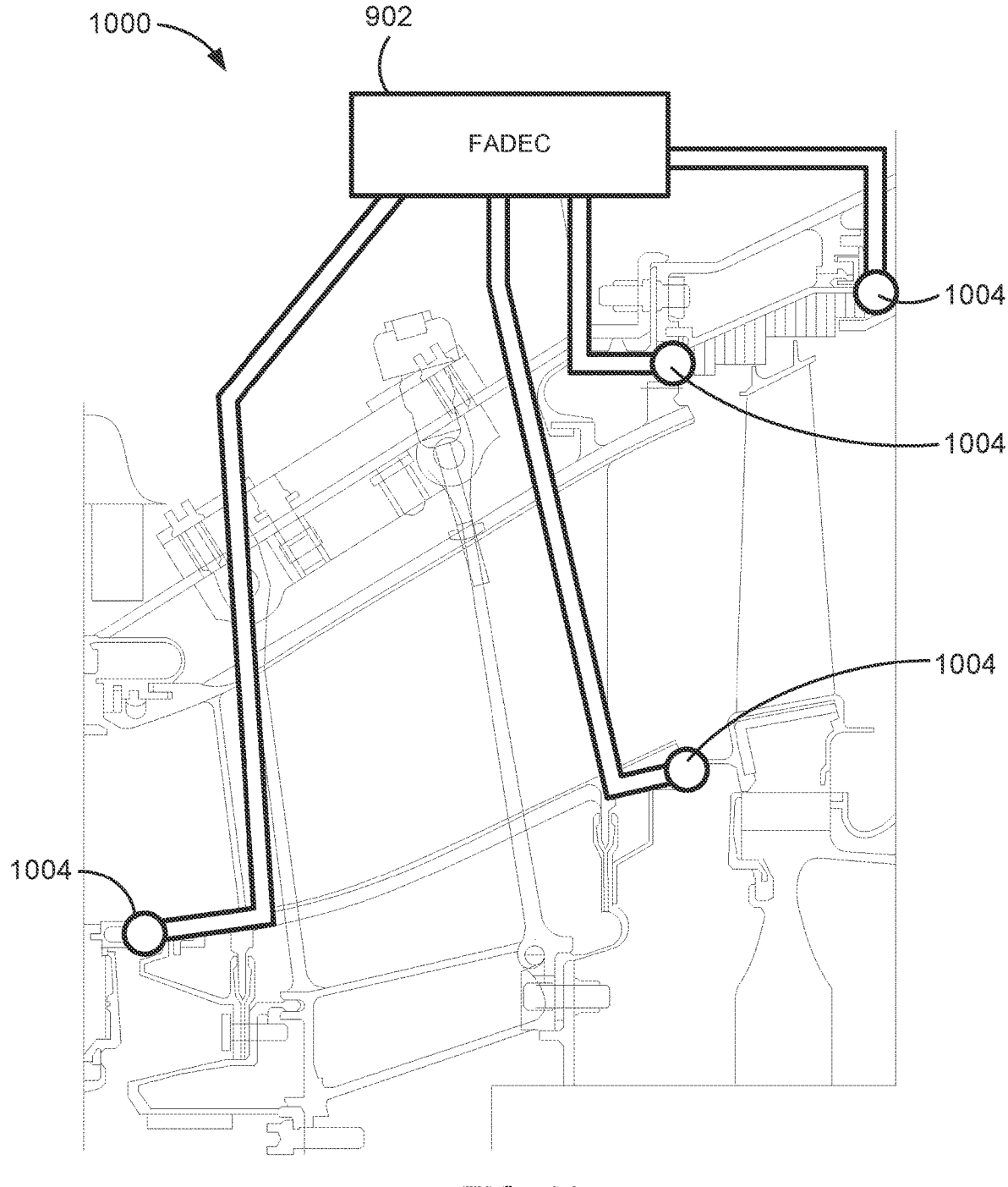
Figure 11:
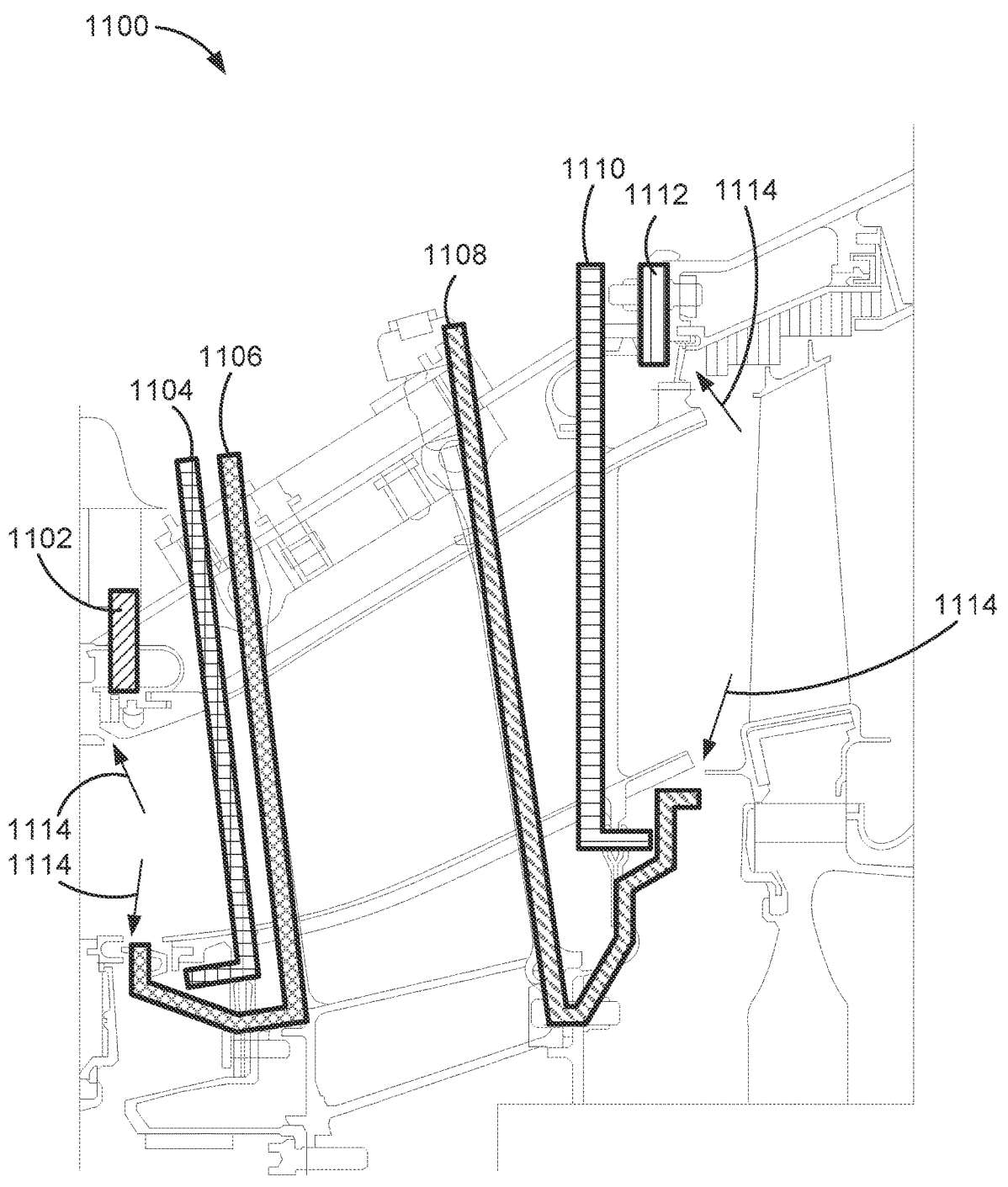

FIGS. 9-11 are schematic cross-sectional views of alternative example sensing configurations that can be implemented in examples disclosed herein. Turning to FIG. 9, an example sensing system 900 is utilized to determine a presence of ingestion flow path air by utilizing measurements (e.g., temperature, pressure) of purged cavities. In the illustrated view of FIG. 9, an example FADEC 902 is communicatively coupled to sensors 904 positioned internally within the gas turbine engine 104. The example FADEC 902 can include and/or communicatively coupled to the status controller 212 shown and described above in connection with FIG. 2. In this example, the sensors 904 are arranged circumferentially (e.g., along an annulus of the gas turbine engine 104) for detection and/or determination of flow path air (or other fluid or object) ingested into the purged cavities. In this example, the sensors 904 are placed into respective cavities that are sensitive to ingestion (e.g., cavities that are likely to exhibit significant changes in temperature due to ingestion) to facilitate determination and/or detection thereof. In some examples, parameters measured at the sensors 904 are averaged and, in turn, compared to a temperature measured by a coolant temperature sensor 910.

According to examples disclosed herein, control logic of the status controller 212 and/or the FADEC 902 can utilize a model (e.g., a data-based model, a physics-based model, a calculation model, a table, etc.) of expected temperatures and/or average temperatures such that measured sensor values are provided as inputs thereto. In some examples, other appropriate types of parameters can be utilized with the model including, but not limited to, speed, pressure, pressure differential, etc. Additionally or alternatively, deviations and/or differences from expected values that are output by the model that exceed a threshold difference can indicate a presence of ingestion or other engine condition. In particular examples, the control logic can utilize a model of expected differences between an engine coolant temperature and the temperature(s) measured by the sensors 904 (e.g., a coolant temperature is compared to sensor values averaged at different locations corresponding to the sensors 904) for determination of a presence of ingestion. According to examples disclosed herein, the model can correspond to an expected relationship between the coolant temperature in conjunction with at least one of the temperature(s) measured by the sensors 904 (e.g., the coolant temperate is compared to an average of temperatures measured by the sensors 904). In a specific example, at least one temperature measured by the sensors 904 and/or an average of the temperatures measured by the sensors 904 exceeding the coolant temperature by 20%, causes and/or triggers a warning related to a determination of ingestion. When a sensor value of the sensors 904 has a difference from a value of the model beyond a threshold difference, the status controller 212 and/or the FADEC 902 can provide and/or set a fault code that triggers an inspection indication and/or warning. For example, a difference between the sensor value of the sensors 904 and the value of the model exceeds 5-10% can trigger an inspection and/or warning indication. According to examples disclosed herein, a determination of a presence of ingestion can trigger such an inspection indication and/or warning. For example, the determination off the presence of ingestion can be utilized to trigger a message and/or flag for service/maintenance to be sent by the status controller 212 and/or the FADEC 902 (e.g., to an aircraft control system or display). The message and/or flag may be utilized to indicate the turbo engine 100 and/or the gas turbine engine 104 is to be repaired, rotated out and/or replaced.

FIG. 10 depicts an example sensing arrangement 1000. In this example, sensors 1004 are placed at different plenums (e.g., annular plenums) or cavities, and communicatively coupled to the aforementioned FADEC 902. In this example, the plenums associated with the sensors 1004 correspond to areas and/or cavities that may be more likely to indicate ingestion and, thus, can vary according to application. In some examples, the plenums can be positioned at, within or proximate the HPT 120 or the LPT 122 shown in FIG. 1. Additionally or alternatively, the plenums can be associated with cavities near outer surfaces of the inner casing 205 shown in FIG. 2, for example. Similar to the example of FIG. 9, example control logic can utilize a model that compares temperatures and/or average temperatures measured by the sensors 1004 to expected/predicted temperature values (e.g., at particular circumferential locations). The expected/predicted temperature values can be based on a measured parameter, such as the coolant temperature mentioned above in connection with FIG. 9. In some examples, a presence of ingestion into the gas turbine engine 104 is determined by determining a temperature delta between the measured temperature values and the expected/predicted temperature values. For example, the presence of ingestion may be determined when a difference between the measured temperature values and the expected/predicted temperature values exceeds a difference threshold.

FIG. 11 depicts an example sensing system 1100. According to the illustrated example of FIG. 11, in forward/upstream positions, a rigid or flexible probe 1102 is provided in an aft HPT, and a rigid probe 1104 is provided in an aft HPT cavity or plenum. Further, a flexible probe 1106 is provided in the aforementioned aft HPT cavity. In terms of aft/downstream positions, in this example, a flexible probe 1108 can be implemented in an LPT forward cavity. Further, a rigid probe 1110 and a rigid or flexible probe 1112 can be positioned forward from the LPT 122 shown in FIG. 1, for example. Further, example arrows 1114 indicate areas and/or regions that may be susceptible to ingestion and/or may indicate the effects of ingestion.

Figures 12, 13:
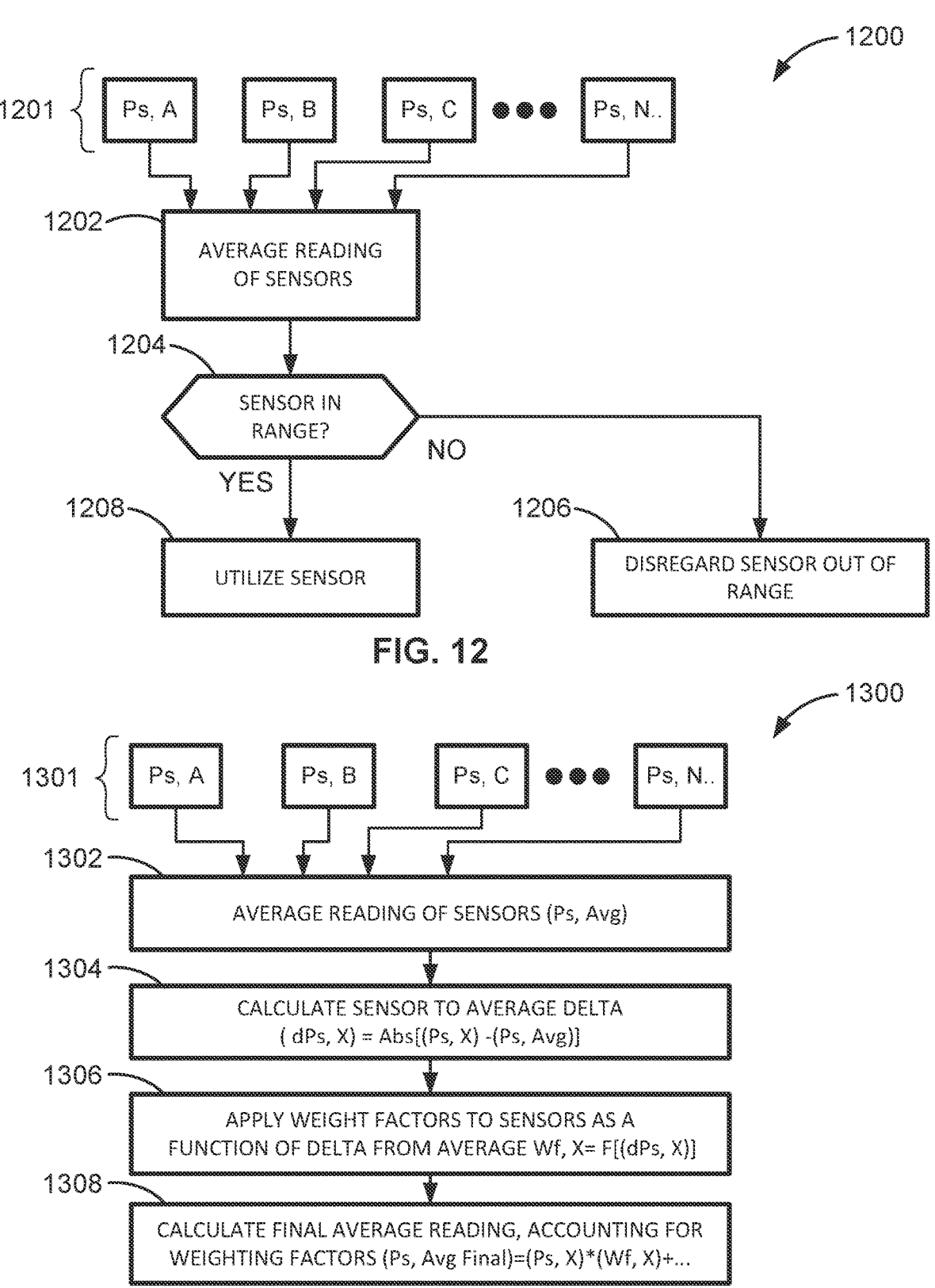
FIG. 12 depicts an example process flow that can be implemented in examples disclosed herein.
FIG. 13 depicts another example process flow that can be implemented in examples disclosed herein.

FIG. 12 depicts a process flow 1200 that can be implemented in examples disclosed herein. In the illustrated example of FIG. 12, pressure sensor measurements 1201 are collected from a plurality of sensors (N—number of sensors). The pressure sensor measurements 1201 are denoted as Ps A, Ps B, Ps C, . . . Ps N. In turn, at block 1202, the pressure sensor measurements 1201 are averaged by the status controller 212 of FIG. 2. According to examples disclosed herein, the sensors can correspond to a source or a sink (e.g., plenums corresponding to the source or the sink). Alternatively, the sensors can correspond to both the source and the sink (e.g., pressure differential sensors operatively coupled to the source and the sink).

At block 1204, it is determined by the status controller 212 as to whether at least one of the sensors is providing output that is in a normal or expected operational range (e.g., an operating range, a threshold range, etc.). For example, if one of the sensors is out of range (block 1204), control of the process proceeds to block 1206 for that sensor. Otherwise, the process proceeds to block 1208. According to examples disclosed, the range can be defined to be within 10-20% of a sensor accuracy range. However, any other appropriate range can be implemented instead.

At block 1206, sensor(s) with output that are out of range are disregarded and/or ignored by the example status controller 212. In some examples, sensor output from the disregarded and/or ignored sensor(s) can be utilized once the sensor is again operating within the normal or expected operational range. For example, a fault reset can be triggered in response to the disregarded and/or ignored sensor(s) returning to providing output that is sufficiently close to the average sensor measurements.

At block 1208, the sensors with measurements in an expected or normal operating range are utilized by the example status controller 212. In particular, corresponding output from these sensor is averaged to determine a status of the gas turbine engine 104. In particular examples, a status of at least one of the bleed offtakes 204 is to be determined (e.g., whether at least one of the bleed offtakes 204 is leaking or detached from the gas turbine engine 104) by the example status controller 212.

FIG. 13 depicts another example process flow 1300 that can be implemented in examples disclosed herein. The example process flow 1300 is similar to the example process flow 1200 of FIG. 12, but instead utilizes weighting (e.g., weighting multipliers). At block 1302, a plurality of pressure sensor measurements 1301 are collected from respective sensors (e.g., an N-number of sensors) and averaged by the example status controller 212. In this example, the pressure sensor measurements 1301 are denoted as "Ps, A," "Ps, B," "Ps, C" . . . "Ps N." According to examples disclosed herein, the average is denoted as "Ps, Avg."

In the illustrated example of FIG. 13, at block 1304, a sensor-to-average difference (e.g., a sensor-to-average delta) is determined by the example status controller 212 for each one of the pressure sensor measurements 1301. Example equation 1 below illustrates an example calculation of a sensor-to-average delta:

$$(dPS, X) = \mathrm{Abs}[(Ps, X) - (Ps.\ Avg)] \tag{1}$$

As a result, whether a sensor significantly deviates (e.g., has a deviation that exceeds a deviation threshold) from the average can be characterized with respect to the sensors.

At block 1306, in some examples, weighting factors denoted as "Wf, X" are applied by the example status controller 212 to (e.g., calculated for, assigned to, etc.) measured parameters of ones of the sensors denoted as "Ps, X," as depicted in example Equation 2 below. In some examples, the weighting factors are applied by the example status controller 212 in a linear scale such that the assigned weighting factors linearly increase from 0 to 1.0 based on a degree of deviation of ones of the sensors to the average. In other examples, the weighting factors are applied using a non-linear scale.

$$Wf, X = F[(dPs, X)] \tag{2}$$

In some such examples, the weighting factors are based on respective ones of the average differences such that sensors having average differences that are relatively lower are applied with relatively higher weighting factors than those that have relatively higher average differences. In other words, sensors that have relatively smaller sensor-to-average differences can have relatively larger weights and/or weighting factors. To that end, sensors with measurements that are relatively closer to a sensor average can be utilized with a greater weight in determining an average of the sensors, for example. However, any other weighting methodology can be implemented instead. For example, different ones of the sensors can be weighted differently based on whether the sensors are in a location/position to more accurately measure and/or characterize a parameter.

At block 1308, a final average reading of the sensors (denoted as "Ps, Avg Final" is calculated by the example status controller 212 to account for the weighting. In particular, output of each of the sensors is provided with a corresponding weighting factor (e.g., an assigned weighting factor) to determine an overall average sensor reading, as shown in Example Equation 3 below.

$$(Ps, X) = (Ps, X) * (Wf, X) + ... \tag{3}$$

The example averaging shown and described in connection with FIGS. 12 and 13 can be applied with any of the examples disclosed herein utilizing a plurality of sensors. In some examples, the weighting factors for each of the pressure readings is in a range from 0.0 to 1.0 such that a sum of the weighting factors is equal to 1.0, for example. In particular, first and second pressure readings may each have a weighting factor of 0.3 while a third pressure reading my have a weighting factor of 0.4 such that a sum of the weighting factors of the first, second and third pressures is equal to 1.0.

Figures 14, 15:
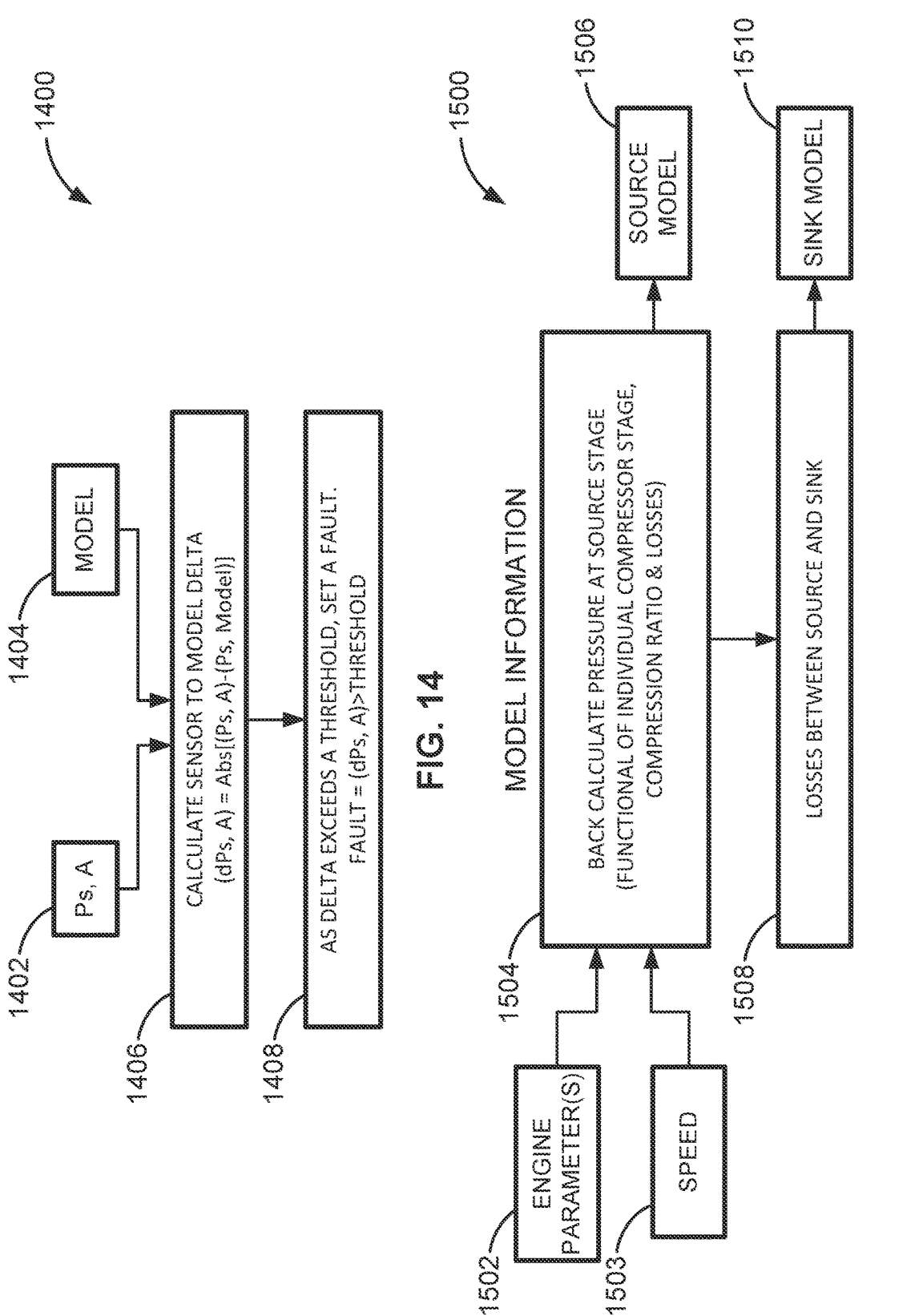
FIG. 14 depicts another example process flow that can be implemented in examples disclosed herein.
FIG. 15 depicts an example model framework that can be implemented in examples disclosed herein.

FIG. 14 depicts an example process flow 1400 that can be implemented in examples disclosed herein. In this example, a parameter 1402 reading corresponding to a sensor, which is denoted as "Ps, A," along with output from an example model 1404 are provided as inputs to block 1406. The example model 1404 can have output that corresponds to expected, calculated and/or predicted parameter values (e.g., predicted pressure, temperature, airflow, etc.) of the example gas turbine engine 104 based on conditions (e.g., external conditions, internal conditions, etc.), operating modes and/or measured parameters (e.g., measured pressure, measured air temperature, measured coolant temperature, measured airflow, etc.). Additionally or alternatively, the model 1404 can correspond to data (e.g., lab data, field testing data, operational field data, historical data, etc.).

According to examples disclosed herein, at block 1406, a difference (e.g., a delta) between the parameter 1402 and a value/parameter that is output by the model 1404 (e.g., an output value and/or parameter predicted by the model 1404 based on the parameter 1402) is calculated. Example Equation 4 below demonstrates how a sensor to model difference can be calculated:

$$(dPs, A) = \mathrm{Abs}[(Ps, A) - (Ps, \mathrm{Model})]. \tag{4}$$

In this example, at block 1408, if the difference exceeds a threshold, a fault notification is provided, transmitted and/or sent, as demonstrated by Example Equation 5 below.

$$\mathrm{Fault} = (dPs, A) > \mathrm{Threshold} \tag{5}$$

In particular, the fault notification can be sent from or to the FADEC 902 and/or the example status controller 212.

In a specific example corresponding to the example of FIG. 14, a pressure corresponding to the parameter 1402 can be measured at a plenum (e.g., a combined volume internal plenum from the bleed offtakes 204). In turn, the example model 1404, which is provided with operational inputs (e.g., engine speed, a pressure at different location, etc.) is utilized to determine a model difference/delta to the measured pressure of the plenum. Accordingly, the model difference/delta is compared to a threshold to determine whether to set a fault. If the model difference/delta exceeds the threshold, then the fault that triggers maintenance/service is provided (e.g., to the FADEC 902 or other control system).

FIG. 15 depicts an example model framework 1500 that can be implemented in examples disclosed herein. In this example, a first parameter 1502 corresponding to a sensor data measurement associated with an engine pressure (or temperature) and/or a second parameter 1503 associated with speed (e.g., a travel speed, air speed, etc.), for example, is utilized as an input for block 1504. In some examples, the first parameter 1502 and the second parameter 1503 are associated with pressures at different locations/positions of the gas turbine engine 104. Additionally or alternatively, the first parameter 1502 and the second parameter 1503 vary with speed and/or temperature. According to the illustrated example, the input for block 1504 corresponds to a calculation of a pressure (e.g., a backpressure) at a source (e.g., the source 208 shown in FIG. 2) that may be based on source stage compression ratio and losses. In this example, a source model 1506 is generated. The source model 1506 can correspond to expected values and/or behavior of the source. At block 1508, losses (e.g., pressure losses) between the source and a corresponding sink (e.g., the sink 210) are characterized, for example. As a result, a sink model 1510 is generated. The example sink model 1510 can correspond to expected values and/or behavior of the sink. According to examples disclosed herein, when a measured sensor value has a difference to output from the source model 1506 and/or the sink model 1510 that exceeds a threshold, an engine controller (e.g., the status controller 212) can indicate a fault (e.g., a fault that would drive and/or trigger an inspection). In some examples, a model can be utilized to determine, calculate and/or predict a first parameter (e.g., a temperature, a pressure, pressure differential, etc.) of a first position of the gas turbine engine 104 based on a second measured parameter (e.g., a temperature, a pressure, pressure differential, etc.) of a second position of the gas turbine engine 104 that is different from the first position. In other words, the model can be utilized to determine parameters of regions that may be difficult to measure and/or position a sensor. While the example process flows of FIGS. 13-15 (and throughout this disclosure) are shown in the context of measured pressures, examples disclosed herein can utilize any other appropriate engine parameters and/or variables.

Figure 16:
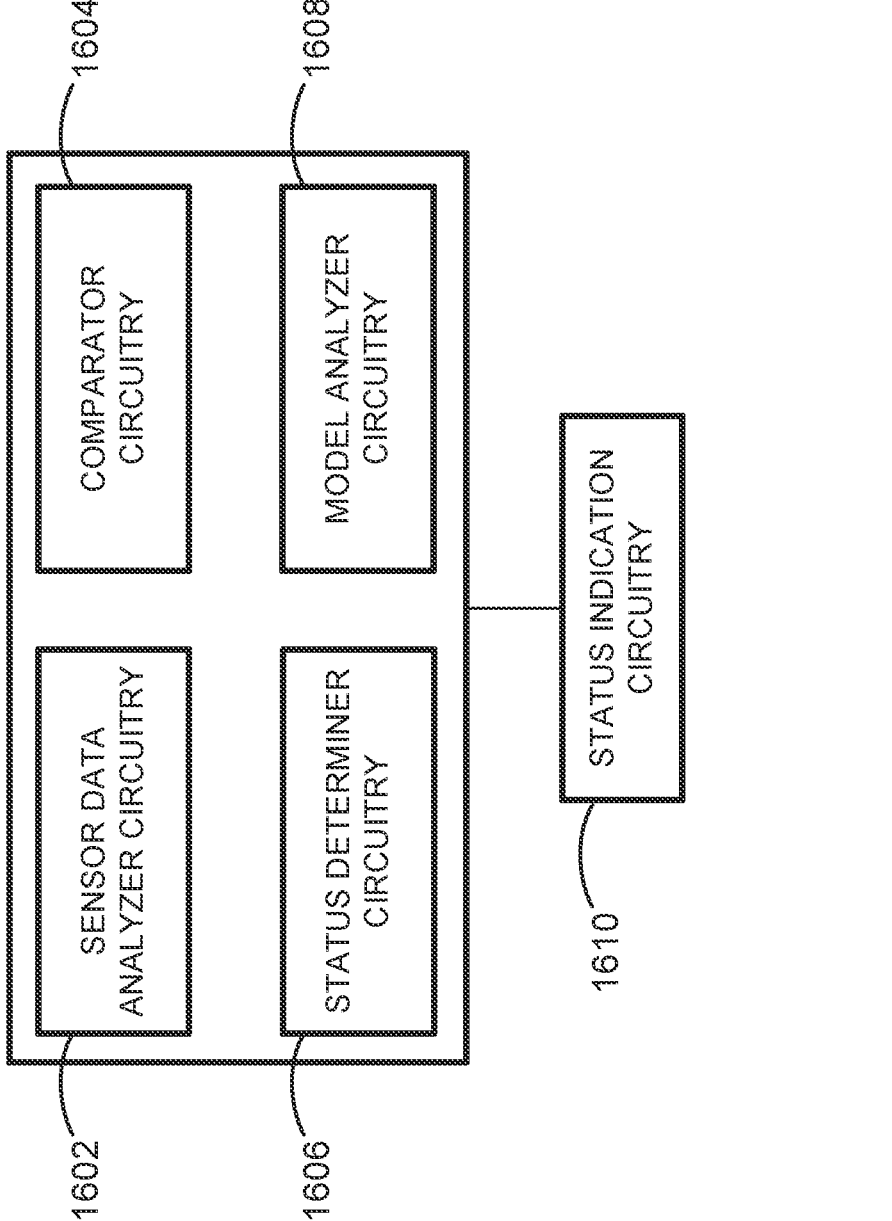
FIG. 16 is a block diagram of an example engine analysis system that can be implemented in examples disclosed herein.
Figure 16:

FIG. 16 is a block diagram of an example implementation of the engine status determination system 200 of FIG. 2 of FIG. 2 to determine a status of the gas turbine engine 104, such as a status corresponding to bleed offtakes (e.g., the bleed offtakes 204) of the gas turbine engine 104, for example. According to the illustrated example of FIG. 16, an engine analysis system 1600 of FIG. 16 can be implemented in or communicatively coupled to the status controller 212, the FADEC 902 or other appropriate engine control system. The example engine analysis system 1600 may be instantiated (e.g., creating an instance of, bring into being for any length of time, materialize, implement, etc.) by programmable circuitry such as a Central Processor Unit (CPU) executing first instructions. Additionally or alternatively, the engine analysis system 1600 of FIG. 16 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 16 may, thus, be instantiated at the same or different times. Some or all of the circuitry of FIG. 16 may be instantiated, for example, in one or more threads executing concurrently on hardware and/or in series on hardware. Moreover, in some examples, some or all of the circuitry of FIG. 16 may be implemented by microprocessor circuitry executing instructions and/or FPGA circuitry performing operations to implement one or more virtual machines and/or containers.

The engine analysis system 1600 of the illustrated example includes example sensor data analyzer circuitry 1602, example comparator circuitry 1604, example status determiner circuitry 1606, and example model analyzer circuitry 1608. According to examples disclosed herein, the engine analysis system 1600 can include and/or be communicatively coupled to example status indication circuitry 1610.

The example sensor data analyzer circuitry 1602 is utilized to analyze, collect and/or characterize sensor signals corresponding to a sink of the bleed offtakes 204 to which outlets of the bleed offtakes are fluidly coupled in conjunction with sensor signals pertaining to a source positioned upstream position from the sink. The source which may or may not correspond to a volume from which flow is supplied to inlets of the bleed offtakes 204. According to some examples disclosed herein, the sensor data analyzer circuitry 1602 can average sensor readings, for example. In particular, the sensor data analyzer circuitry 1602 can average sensors grouped together (e.g., a plurality of sensors grouped together for redundancy to measure a parameter corresponding to a sink or a source). Additionally or alternatively, the sensor data analyzer circuitry 1602 is utilized to determine and/or select which sensor data is to be utilized such that sensor data (e.g., sensor output) pertaining to sensors that deviate from averaged data to a relatively higher degree are disregarded and/or ignored. According to examples disclosed herein, the sensor data analyzer circuitry 1602 determines a differential pressure between different annular plenums and/or internal locations of the gas turbine engine 104. In turn, this determination of the differential pressure enables a determination of a component status (e.g., a status of the bleed offtakes), a presence of ingestion and/or a general health of the gas turbine engine 104, etc. In some examples, the sensor data analyzer circuitry 1602 is instantiated by programmable circuitry executing sensor data analyzer instructions and/or configured to perform operations such as those represented by the flowcharts of FIGS. 17-20.

In the illustrated example of FIG. 16, the comparator circuitry 1604 is utilized to compare first sensor data corresponding to the aforementioned sink in which flow is recombined from bleed offtakes to second sensor data corresponding to a position, volume and/or plenum that is upstream and/or in a fore location from the aforementioned sink. The fore location may correspond to the source. According to examples disclosed herein, the comparator circuitry 1604 compares a first parameter at or downstream of the sink to a second parameter of the source, which may be adjacent to the sink, in some examples. At least one of the first and second parameters can correspond to pressure, temperatures, pressure differentials, flow rates, etc.

In some examples, the comparator circuitry 1604 compares measured values to values provided by a model as output. In some such examples, the model is provided with an input such as a measured value and, in turn, the model outputs the values for comparison to plenum measurements, for example. The model can be physics-based, analytical and/or based on measured/historical data. In some examples, the comparator circuitry 1604 is instantiated by programmable circuitry executing comparator instructions and/or configured to perform operations such as those represented by the flowcharts of FIGS. 17-20.

The example status determiner circuitry 1606 of the illustrated example determines a status, state and/or condition of the gas turbine engine 104. According to examples disclosed herein, the status determiner circuitry 1606 determines a status and/or operating condition of the bleed offtakes 204 based on the comparison performed by the comparator circuitry 1604. For example, the status determiner circuitry 1606 can determine whether at least one of the bleed offtakes 204 is damaged and/or leaking based on pressure and/or pressure differential measurements corresponding to the sink and the source. Additionally or alternatively, the status determiner circuitry 1606 determines a presence of ingestion in compartments and/or plenums of the gas turbine engine 104 (e.g., via temperatures measured in cavities of the HPT 120 or LPT 122 or any other volume that is sensitive to the temperature changes associated with ingestion) in comparison to engine coolant temperatures, for example. In some examples, the status determiner circuitry 1606 is instantiated by programmable circuitry executing status determiner circuitry instructions and/or configured to perform operations such as those represented by the flowchart(s) of FIGS. 17-20.

In some examples, the model analyzer circuitry 1608 is implemented to utilize and/or generate a model to determine, calculate, and/or estimate conditions and/or parameters of the gas turbine engine 104 based on inputs. The inputs may include, but are not limited to, measured engine parameters, engine operational settings, external conditions, etc. In some examples, the model analyzer circuitry 1608 utilizes a model to determine an expected pressure loss between the source and the sink. According to examples disclosed herein, the model can utilize an engine parameter, setting and/or condition to model at least one aspect (e.g., a pressure) of a sink and/or a source. However, the model can utilize any other appropriate input. In some examples, the model is utilized to estimate a pressure at a location of the gas turbine engine 104 that is not measured or is difficult to measure (e.g., via another pressure that is provided as input). In some examples, the model analyzer circuitry 1608 is instantiated by programmable circuitry executing model analyzer instructions and/or configured to perform operations such as those represented by the flowcharts of FIGS. 17-20.

In some examples, the status indication circuitry 1610 is implemented to convey and/or provide information regarding a status (e.g., a status of the bleed offtakes). The example status indication circuitry 1610 can convey and/or provide this information to the FADEC 902 of FIG. 9, the status controller 212 or another engine or aircraft control system, for example. In some examples, the status indication circuitry 1610 is instantiated by programmable circuitry executing status indication instructions and/or configured to perform operations such as those represented by the flowcharts of FIGS. 17-20.

While an example manner of implementing the engine analysis system 1600 of FIG. 1 is illustrated in FIG. 16, one or more of the elements, processes, and/or devices illustrated in FIG. 16 may be combined, divided, re-arranged, omitted, eliminated, and/or implemented in any other way. Further, the example sensor data analyzer circuitry 1602, the example comparator circuitry 1604, the example status determiner circuitry 1606, the example model analyzer circuitry 1608, the example status indication circuitry 1610, and/or, more generally, the example engine analysis system 1600 of FIG. 16, may be implemented by hardware alone or by hardware in combination with software and/or firmware. Thus, for example, any of the example sensor data analyzer circuitry 1602, the example comparator circuitry 1604, the example status determiner circuitry 1606, the example model analyzer circuitry 1608, the example status indication circuitry 1610, and/or, more generally, the example engine analysis system 1600, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example engine analysis system 1600 of FIG. 16 may include one or more elements, processes, and/or devices in addition to, or instead of, those illustrated in FIG. 16, and/or may include more than one of any or all of the illustrated elements, processes and devices.

Flowcharts representative of example machine readable instructions, which may be executed by programmable circuitry to implement and/or instantiate the engine analysis system 1600 of FIG. 16 and/or representative of example operations which may be performed by programmable circuitry to implement and/or instantiate the engine analysis system 1600 of FIG. 16, are shown in FIGS. 17-20. The machine readable instructions may be one or more executable programs or portion(s) of one or more executable programs for execution by programmable circuitry such as the programmable circuitry 2112 shown in the example programmable circuitry platform 2100 discussed below in connection with FIG. 21 and/or may be one or more function (s) or portion(s) of functions to be performed by the example programmable circuitry (e.g., an FPGA) discussed below in connection with FIGS. 22 and/or 23. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across a plurality of hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 17-20, many other methods of implementing the example engine analysis system 1600 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, a plurality of processors distributed across a plurality of servers of a server rack, a plurality of processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in a plurality of parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 17-20 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 17:
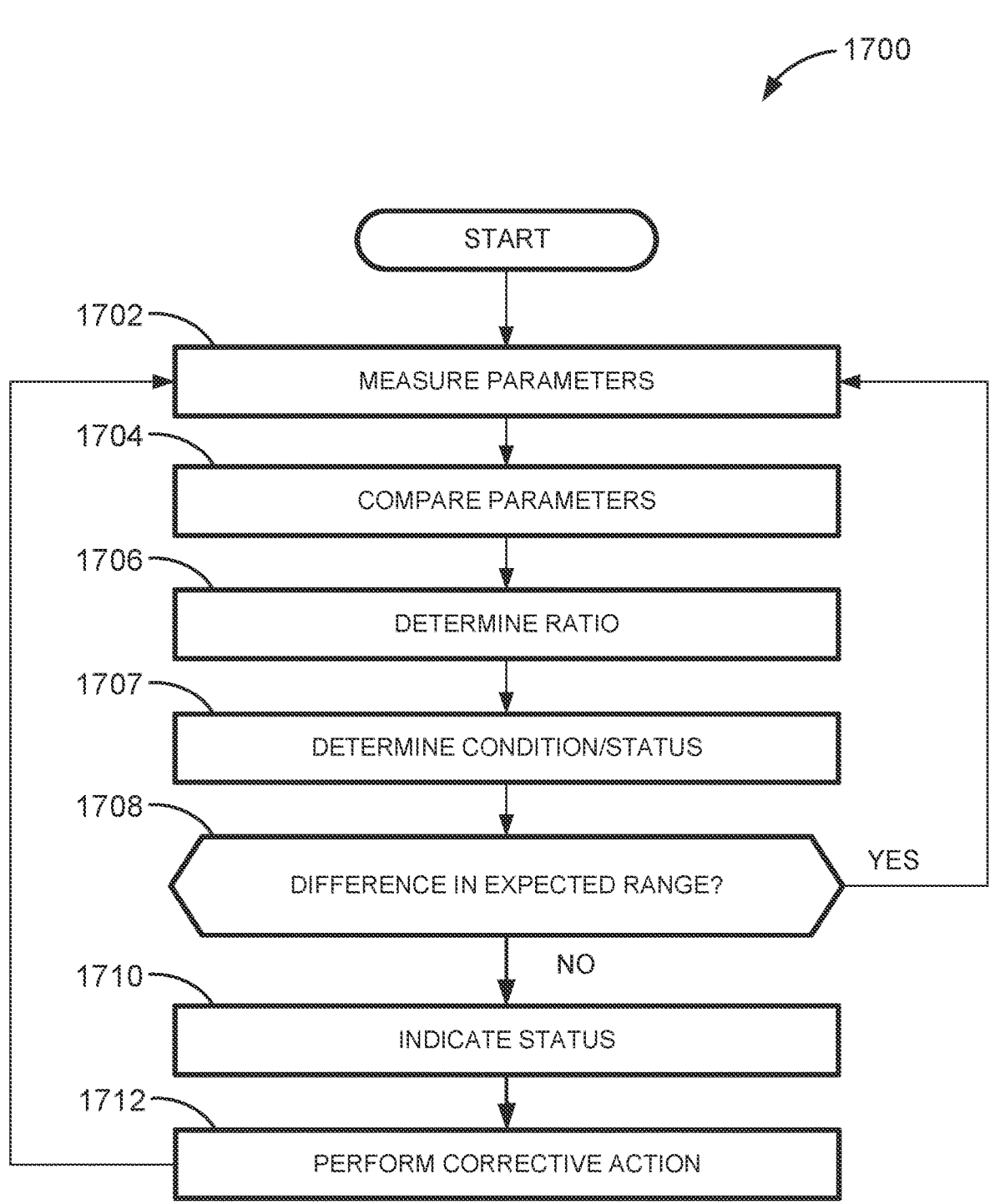
FIGS. 17-20 are flowcharts representative of example machine readable instructions and/or example operations that may be executed, instantiated, and/or performed by example programmable circuitry to implement the example engine analysis system of FIG. 16.

"FIG. 17 is a flowchart representative of example machine readable instructions and/or example operations 1700 that may be executed, instantiated, and/or performed by programmable circuitry to determine a status of the gas turbine engine 104. For example, the status can pertain to a status of the bleed offtakes 204, a status of sensors, a health of the gas turbine engine 104 (e.g., an operational life remaining, a service/maintenance time period), a presence or occurrence of ingestion, a status of seals, or an operating status of the gas turbine engine 104. The example machine-readable instructions and/or the example operations 1700 of FIG. 17 begin at block 1702, at which the example sensor data analyzer circuitry 1602 causes at least one sensor to measure at least one parameter corresponding to first and second plenums along an airflow path of the gas turbine engine 104. In this example, the first and second plenums correspond to a source and a sink, respectively. The example sensor data analyzer circuitry 1602 can utilize measurements corresponding to a pressure, a temperature and/or a pressure differential of the aforementioned first and second plenums. In some examples, remote sensing lines and/or tubes are utilized in conjunction with respective sensors to measure parameters of the first and second plenums. As a result, the sensors can be placed in externally accessible areas of the gas turbine engine 104 while enabling measurement of internal portions and/or areas of the gas turbine engine 104.

At block 1704, the example comparator circuitry 1604 compares the at least one parameter to a threshold. Additionally or alternatively, the example comparator circuitry 1604 compares at least two parameters to one another and/or a model. In some examples, the comparator circuitry 1604 determines a difference between the first and second pressures. In some examples, the comparator circuitry 1604 compares a model value to a value. Alternatively, the comparator circuitry 1604 compares different model values to one another.

At block 1706, additionally or alternatively, the example status determiner circuitry 1606 determines and/or calculates a ratio of the parameters for determination of the status of the gas turbine engine 104. The ratio can be a pressure ratio, a temperature ratio or any other appropriate other ratio. In particular examples, the ratio is utilized to determine whether the bleed offtakes 204 are operating normally and/or within expected parameters.

At block 1707, the example status determiner circuitry 1606 determines a status and/or condition of the gas turbine engine 104 based on the comparison performed by the example comparator circuitry 1604 and/or the ratio calculated by the status determiner circuitry 1606. In some examples, the status and/or condition is determined based on a difference between the parameters (e.g., a temperature difference, a pressure difference, etc.). In some examples, a model is utilized in determining the status such that the model may convey an expected value of a parameter based on certain inputs (e.g., engine operating conditions, engine operating settings, etc.). In turn, the expected value can be compared to a measured sensor value to determine the engine status.

At block 1708, the example status determiner circuitry 1606 determines whether a difference between at least one parameter and an expected value is in an expected range and/or is below/above a threshold difference. For example, a difference in pressures, a pressure differential and/or a ratio being in an expected range (e.g., an operational range, an expected range) indicates that the gas turbine engine 104 is operating normally (e.g., the bleed offtakes 204 are operating normally). If the difference is within the expected range (block 1708), control of the process returns to block 1702. Otherwise, the process proceeds to block 1710.

At block 1710, in some examples, the status indication circuitry 1610 of the illustrated example indicates and/or provides a status of the gas turbine engine 104 and/or the turbo engine 100. In some such examples, a status message indicating a need for servicing is provided by the status indication circuitry 1610. The message can be provided and/or transmitted to the FADEC 902 and/or a maintenance scheduling system, for example. Additionally or alternatively, the message can cause the gas turbine engine 104 and/or the turbo engine 100 to perform in a mode that is different from a normal operating mode (e.g., in a reduced performance mode).

At block 1712, additionally or alternatively, in some examples, the status determiner circuitry 1606 and/or the status indication circuitry 1610 causes a corrective/mitigative action to be performed and the process returns to block 1702. For example, based on a status of the gas turbine engine 104 and/or the turbo engine 100, the FADEC 902 can be directed to operate the gas turbine engine 104 and/or the turbo engine 100 at a reduced performance and/or throttle (e.g., in a reduced operational mode) to mitigate any potential damage (e.g., further damage) thereto.

Figure 18:
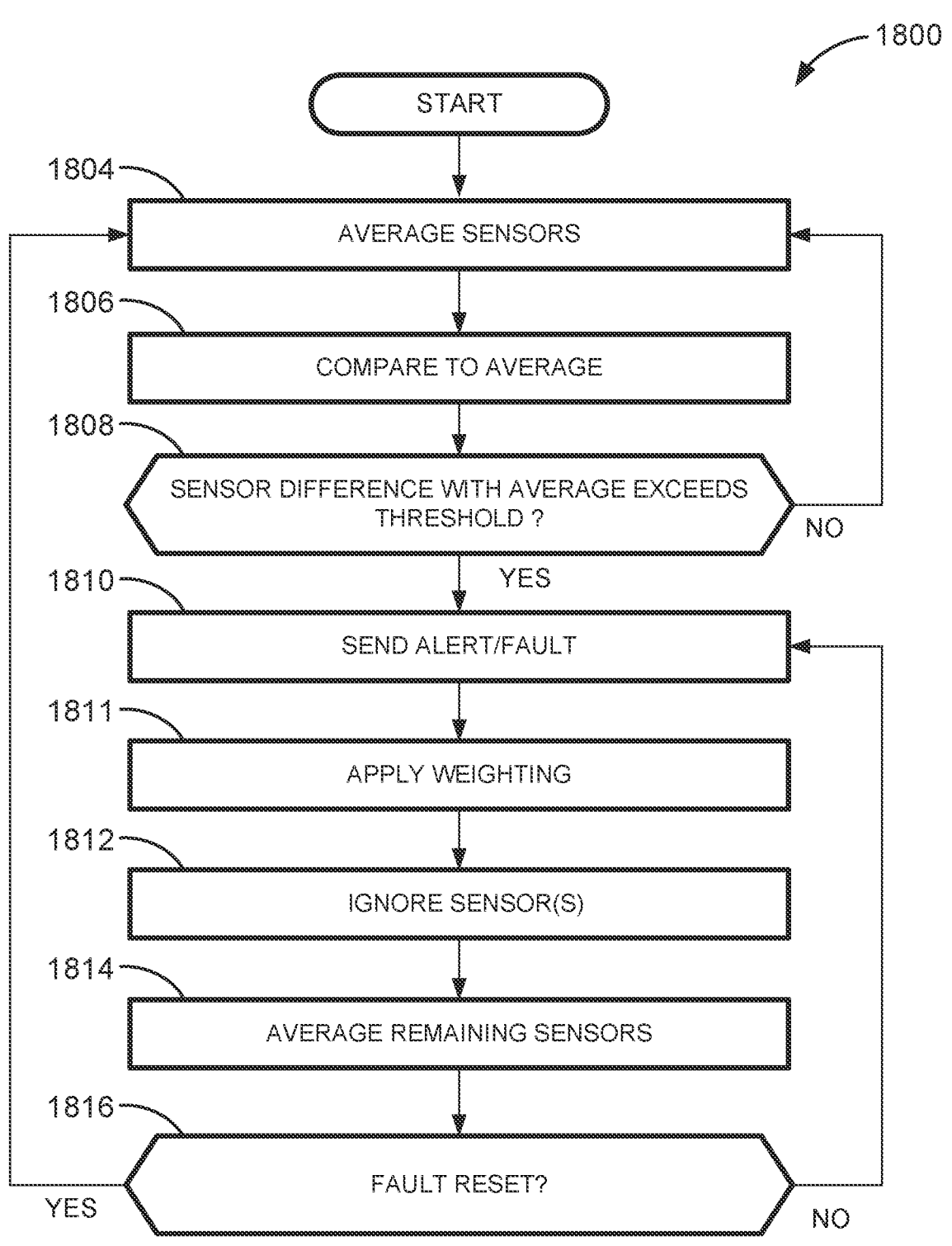

FIG. 18 is a flowchart representative of example machine readable instructions and/or example operations 1800 that may be executed, instantiated, and/or performed by programmable circuitry to determine which sensors are to be utilized (e.g., for bleed offtake determination status, for determining a presence of ingestion, etc.). The example machine-readable instructions and/or the example operations 1800 of FIG. 18 begin at block 1804, at which sensor output/information from a plurality of sensors is averaged by the example sensor data analyzer circuitry 1602. In this example, pressure measurements from a plurality of sensors in groups corresponding to a source and a sink are averaged based on the groups (e.g., first readings averaged for the sink and second readings averaged for the source), including source data and sink data. In this particular example, a first plenum corresponding to the source is measured by three absolute pressure sensors in a first group while a second plenum corresponding to a sink is measured by three absolute pressure sensors in a second group. Alternatively, three differential pressure sensors can be utilized to determine a plurality of pressure differential readings between the sink and the source. In other examples, two sensors are utilized to measure each of the source and sink.

At block 1806, the example comparator circuitry 1604 compares individual sensor measurements to the average corresponding to the respective group. In the illustrated example of FIG. 18, a difference to the average is calculated for each of the sensors.

At block 1808, it is determined by the example comparator circuitry 1604 as to whether a difference of at least one of the sensors with the average exceeds a threshold (e.g., a difference threshold, a differential threshold, etc.). If at least one of the sensor readings has a difference that exceeds the threshold (block 1808), the process proceeds to block 1810. Otherwise, the process returns to block 1804. According to examples disclosed herein, the threshold can correspond to approximately 10-20% of a sensor accuracy range. However, any appropriate other threshold can be implemented instead.

At block 1810, in some examples, the status indication circuitry 1610 transmits and/or sends an alert (e.g., to the FADEC 902 or other engine/aircraft control system). In some examples, the alert can convey information in a message or flag that identifies at least one of the sensors having a difference that exceeds the threshold for service/maintenance (e.g., to initiate service/maintenance). The message or flag can cause the FADEC 902 to indicate that the gas turbine engine 104 and/or the turbo engine 100 is to be rotated out for service/maintenance. Additionally or alternatively, the message or flag can cause the gas turbine engine 104 and/or the turbo engine 100 to operate in a reduced operation mode to prevent damage thereto.

At block 1811, in some examples, the sensor data analyzer circuitry 1602 of the illustrated example applies weighting to data output and/or values corresponding to individual sensors. In particular, the example sensor data analyzer circuitry 1602 assigns a weighting factor to each of the sensors such that the weighting factors can be used as multipliers (e.g., unitless multipliers) in averaging measurements/output that are provided by the sensors (e.g., sensors relatively closer to the sensor average can have relatively higher weighting factors). In a specific example, a first sensor output can have a weighting factor of 0.7 while a second sensor output has a weighting factor of 0.3. Accordingly, an overall/final average can be calculated by multiplying 0.7 times the first sensor output and adding that sum to the product of 0.3 times the second sensor output.

At block 1812, the example sensor data analyzer circuitry 1602 causes output from at least one sensor having difference to the average exceeding a difference threshold to be ignored and/or disregarded. In other examples, the sensor is disabled (e.g., temporarily disabled for a requisite time period, temporarily disabled until the sensor returns to having output within a threshold difference of the average, etc.).

In the illustrated example, at block 1814, the sensor data analyzer circuitry 1602 averages the remaining sensors that are not ignored and/or disregarded to define a finalized average. In this example, the remaining sensors are averaged and the average is utilized to determine a parameter (e.g., an averaged plenum pressure, an averaged plenum temperature, an averaged pressure differential, etc.) corresponding to a plenum (e.g., a plenum associated with the source, a plenum associated with the sink, etc.).

At block 1816, the sensor data analyzer circuitry 1602 analyzes the finalized average of the sensor values to determine whether to cause a fault reset. In particular, a sensor that is out of range from the average can cause a fault reset once it returns to providing output that is within a requisite range of the average. Additionally or alternatively, the fault can be reset after a requisite time has elapsed after the fault has been initiated. If the fault is to be reset (block 1816), control of the process returns to block 1804. Otherwise, the returns to block 1810.

Figure 19:
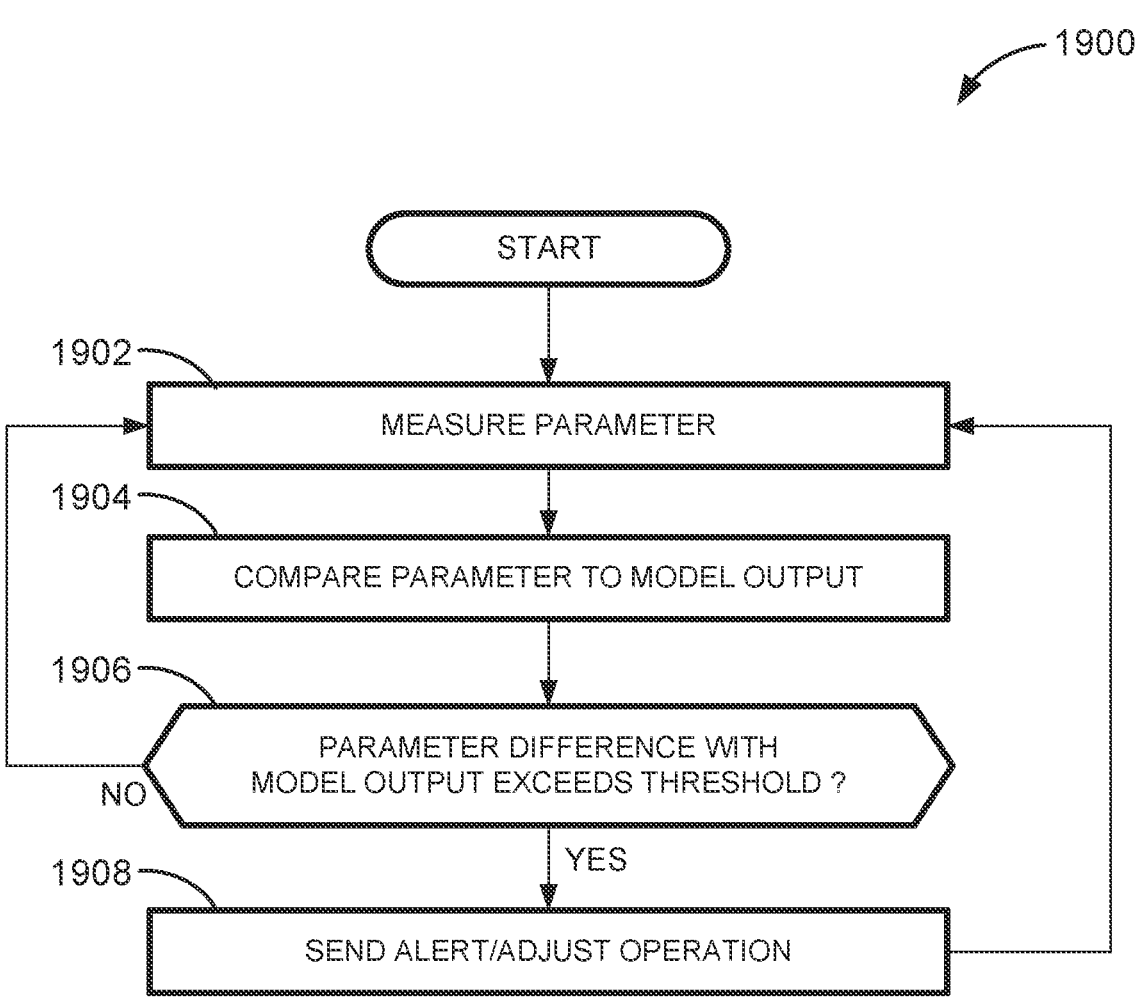

FIG. 19 is a flowchart representative of example machine readable instructions and/or example operations 1900 that may be executed, instantiated, and/or performed by programmable circuitry to determine a status of the gas turbine engine 104 via a model. For example, the status can pertain to a status of the bleed offtakes 204. Additionally or alternatively, the status can correspond to a presence of ingestion in the gas turbine engine 104. The example machine-readable instructions and/or the example operations 1900 of FIG. 19 begin at block 1902, at which the sensor data analyzer circuitry 1602 causes at least one sensor to measure at least one parameter (e.g., a pressure, a temperature, a pressure differential, etc.).

At block 1904, the model analyzer circuitry 1608 of the illustrated example compares the measured parameter to output from a model. The model can be physics-based or based on engine data (e.g., field engine data). The model can relate operational inputs and/or conditions with expected behavior, performance and/or characteristics of the gas turbine engine 104. In some particular examples, the model relates pressure and/or temperature from one location of the gas turbine engine 104 to another location of the gas turbine engine 104. For example, a pressure measured at a first plenum can be utilized to predict a pressure at a second plenum with a model.

At block 1906, the example model analyzer circuitry 1608 determines if the difference between the measured parameter and the model output exceeds a threshold. If the difference exceeds the threshold (block 1906), control of the process proceeds to block 1908. Otherwise, the process returns to block 1902.

At block 1908, in some examples, the example status indication circuitry 1610 sends an alert message indicating a fault or indication of a malfunction of the gas turbine engine 104 and/or the turbo engine 100, and the process returns to block 1902. Additionally or alternatively, an operation of the gas turbine engine 104 and/or the turbo engine 100 is adjusted based on the alert indicating a fault or indication of the gas turbine engine 104 and/or the turbo engine 100. To that end, the gas turbine engine 104 and/or the turbo engine 100 can operate in a reduced operational capacity.

Figure 20:
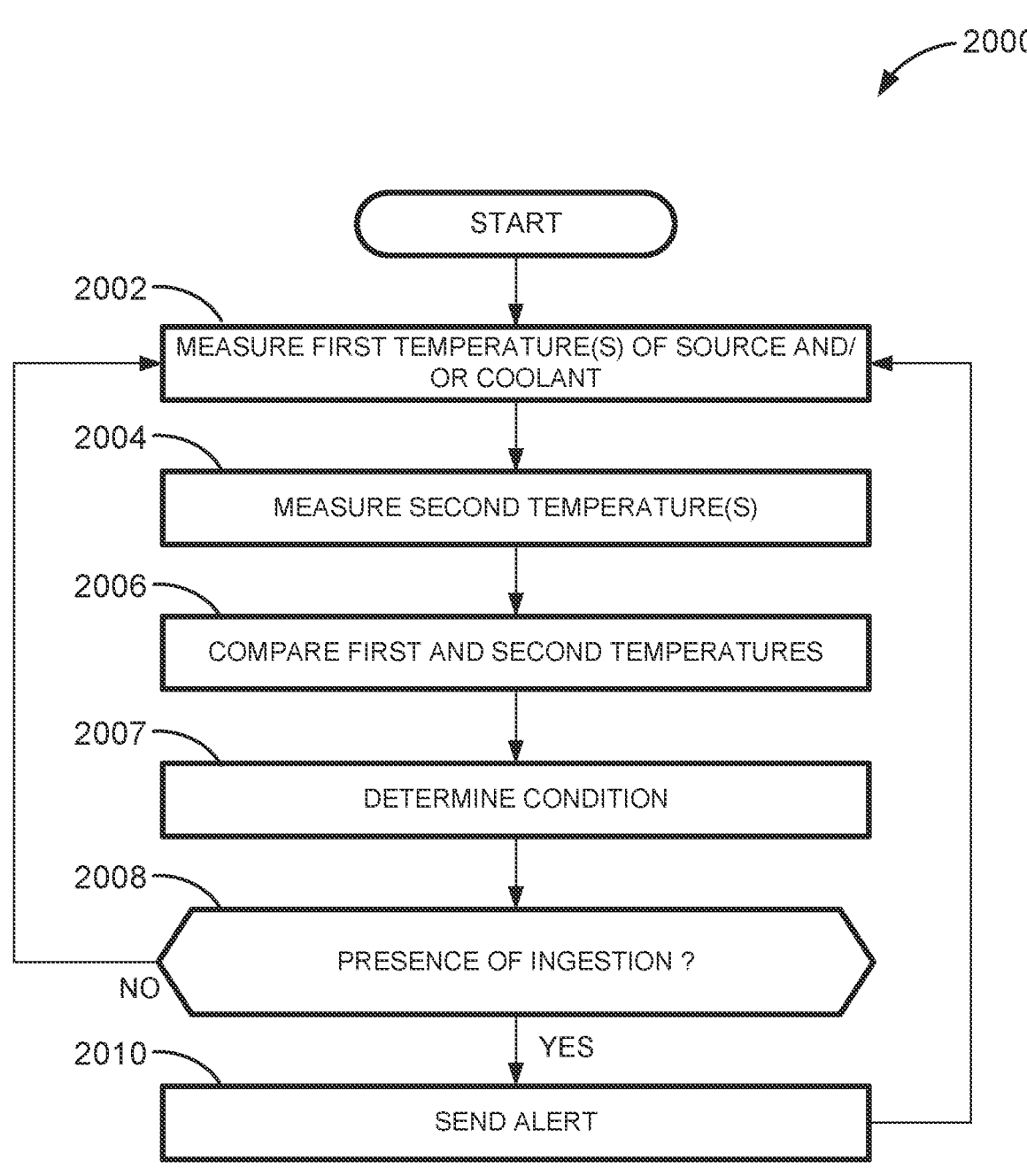

FIG. 20 is a flowchart representative of example machine readable instructions and/or example operations 2000 that may be executed, instantiated, and/or performed by programmable circuitry to determine a status of the gas turbine engine 104 with respect to a presence of ingestion. The example machine-readable instructions and/or the example operations 2000 of FIG. 20 begin at block 2002, at which the sensor data analyzer circuitry 1602 causes at least one sensor to measure a temperature of a source and/or a parameter of gas turbine engine 104. In this example, the measured parameter corresponds to a first temperature of engine coolant, for example.

At block 2004, the example sensor data analyzer circuitry 1602 causes at least one sensor to measure a second temperature corresponding to an internal plenum and/or volume of the gas turbine engine 104 that is susceptible to and/or indicative of temperature changes that can be caused by ingestion. In some examples, temperatures of a plurality of plenums susceptible to the effects of ingestion are averaged. Additionally or alternatively, examples disclosed herein related to disregarding and/or weighting sensor data can be utilized.

At block 2006, in some examples, the comparator circuitry 1604 of the illustrated example compares the first and second temperatures and determines a difference therebetween. In some examples, a model is utilized to relate expected values of the first and second temperatures.

At block 2007, the status determiner circuitry 1606 of the illustrated example determines an ingestion condition of the gas turbine engine 104 based on the aforementioned comparison of the first and second temperatures (e.g., a differential between the first and second temperatures).

At block 2008, it is determined by the example status determiner circuitry 1606 if ingestion is present based on the ingestion condition (block 2007). If ingestion is present (block 2008), control or the process proceeds to block 2010. Otherwise, the process returns to block 2002.

At block 2010, the example status indication circuitry 1610 provides, sends and/or transmits an alert and the process returns to block 2002. For example, the example status indication circuitry 1610 can provide the alert to the FADEC 902 to indicate a need for servicing of the gas turbine engine 104 and/or sensors related to the gas turbine engine 104. Additionally or alternatively, the example status indication circuitry 1610 can cause the gas turbine engine 104 to operate in a reduced capacity based on the determination of the presence of ingestion.

Figure 21:
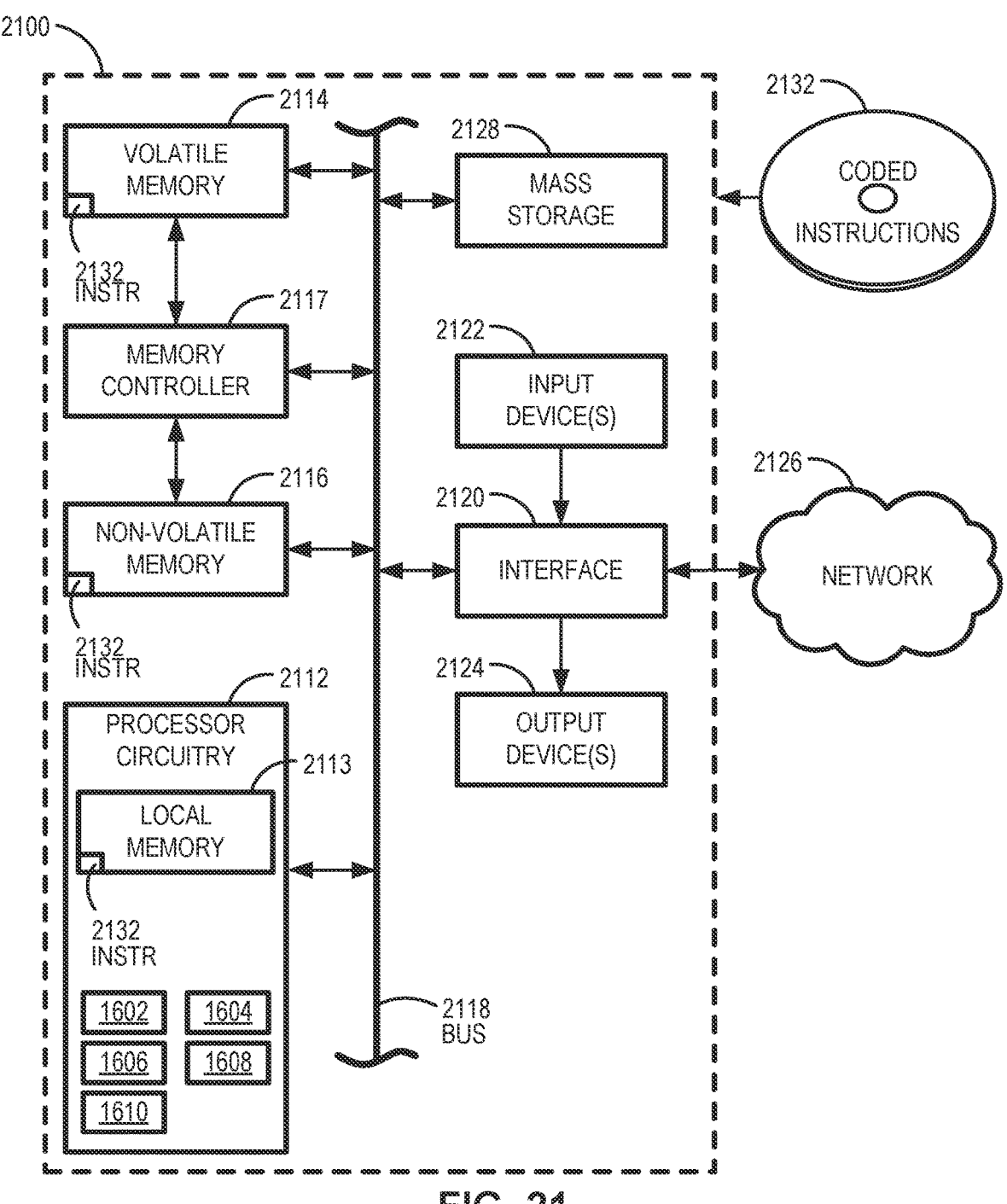
FIG. 21 is a block diagram of an example processing platform including programmable circuitry structured to execute, instantiate, and/or perform the example machine readable instructions and/or perform the example operations of FIGS. 17-20 to implement the example engine analysis system of FIG. 16.

FIG. 21 is a block diagram of an example programmable circuitry platform 2100 structured to execute and/or instantiate the example machine-readable instructions and/or the example operations of FIGS. 17-20 to implement the engine analysis system 1600 of FIG. 16. The programmable circuitry platform 2100 can be, for example, a server, a personal computer, a workstation, a self-learning machine (e.g., a neural network), or any other type of computing and/or electronic device.

The programmable circuitry platform 2100 of the illustrated example includes programmable circuitry 2112. The programmable circuitry 2112 of the illustrated example is hardware. For example, the programmable circuitry 2112 can be implemented by one or more integrated circuits, logic circuits, FPGAs, microprocessors, CPUs, GPUs, DSPs, and/or microcontrollers from any desired family or manufacturer. The programmable circuitry 2112 may be implemented by one or more semiconductor based (e.g., silicon based) devices. In this example, the programmable circuitry 2112 implements the example sensor data analyzer circuitry 1602, the example comparator circuitry 1604, the example status determiner circuitry 1606, the example model analyzer circuitry 1608, and the example status indication circuitry 1610.

The programmable circuitry 2112 of the illustrated example includes a local memory 2113 (e.g., a cache, registers, etc.). The programmable circuitry 2112 of the illustrated example is in communication with main memory 2114, 2116, which includes a volatile memory 2114 and a non-volatile memory 2116, by a bus 2118. The volatile memory 2114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2116 may be implemented by flash memory and/or any other desired type of memory device. Access to the main memory 2114, 2116 of the illustrated example is controlled by a memory controller 2117. In some examples, the memory controller 2117 may be implemented by one or more integrated circuits, logic circuits, microcontrollers from any desired family or manufacturer, or any other type of circuitry to manage the flow of data going to and from the main memory 2114, 2116.

The programmable circuitry platform 2100 of the illustrated example also includes interface circuitry 2120. The interface circuitry 2120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2122 are connected to the interface circuitry 2120. The input device(s) 2122 permit(s) a user (e.g., a human user, a machine user, etc.) to enter data and/or commands into the programmable circuitry 2112. The input device(s) 2122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2124 are also connected to the interface circuitry 2120 of the illustrated example. The output device(s) 2124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2120 of the illustrated example, thus, typically includes a graphics driver card, a graphics driver chip, and/or graphics processor circuitry such as a GPU.

The interface circuitry 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 2100 of the illustrated example also includes one or more mass storage discs or devices 2128 to store firmware, software, and/or data. Examples of such mass storage discs or devices 2128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 2132, which may be implemented by the machine readable instructions of FIGS. 17-20, may be stored in the mass storage device 2128, in the volatile memory 2114, in the non-volatile memory 2116, and/or on at least one non-transitory computer readable storage medium such as a CD or DVD which may be removable.

Figure 22:
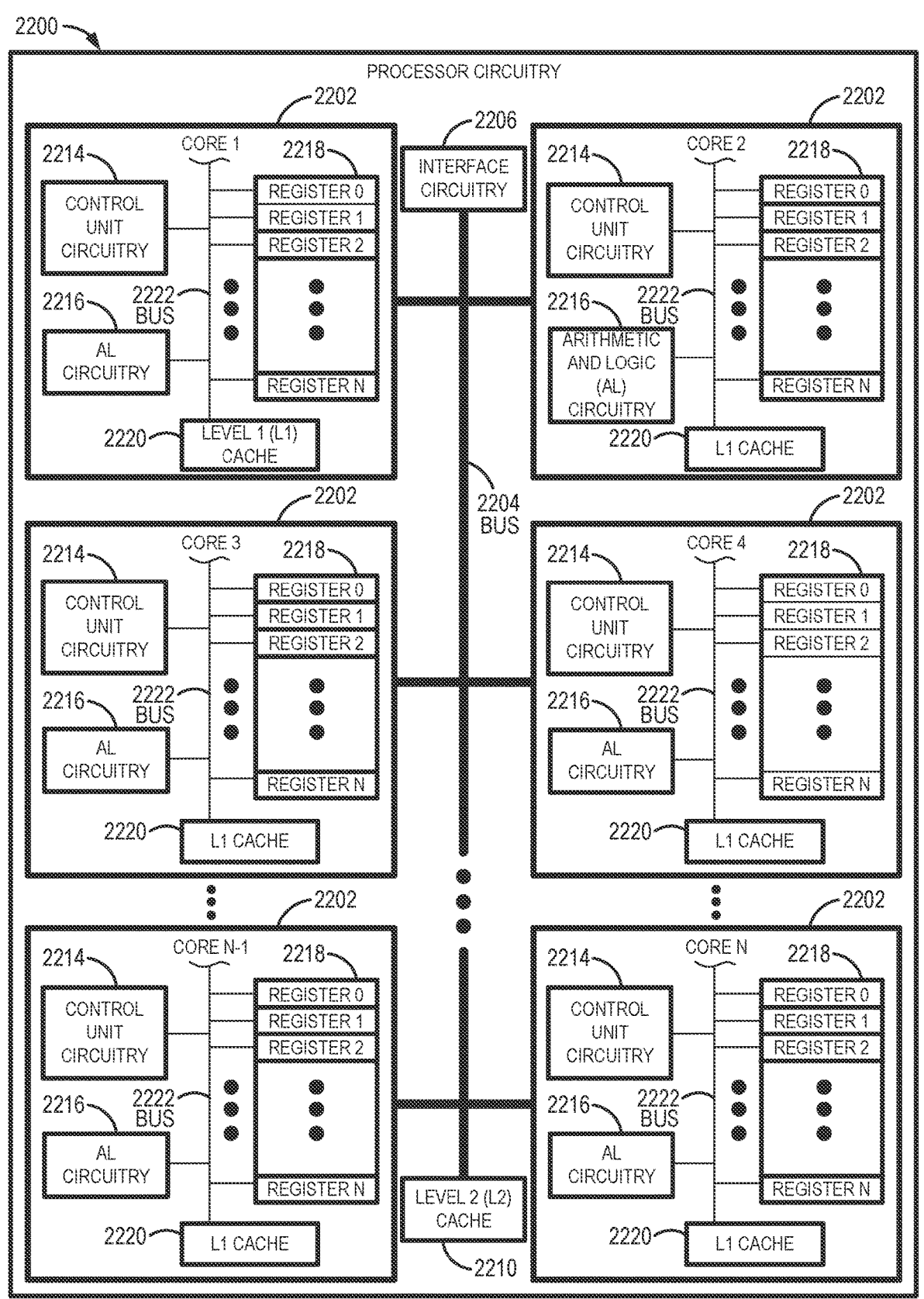
FIG. 22 is a block diagram of an example implementation of the programmable circuitry of FIG. 21.

FIG. 22 is a block diagram of an example implementation of the programmable circuitry 2112 of FIG. 21. In this example, the programmable circuitry 2112 of FIG. 21 is implemented by a microprocessor 2200. For example, the microprocessor 2200 may be a general-purpose microprocessor (e.g., general-purpose microprocessor circuitry). The microprocessor 2200 executes some or all of the machine-readable instructions of the flowcharts of FIGS. 17-20 to effectively instantiate the circuitry of FIG. 16 as logic circuits to perform operations corresponding to those machine readable instructions. In some such examples, the circuitry of FIG. 16 is instantiated by the hardware circuits of the microprocessor 2200 in combination with the machine-readable instructions. For example, the microprocessor 2200 may be implemented by multi-core hardware circuitry such as a CPU, a DSP, a GPU, an XPU, etc. Although it may include any number of example cores 2202 (e.g., 1 core), the microprocessor 2200 of this example is a multi-core semiconductor device including N cores. The cores 2202 of the microprocessor 2200 may operate independently or may cooperate to execute machine readable instructions. For example, machine code corresponding to a firmware program, an embedded software program, or a software program may be executed by one of the cores 2202 or may be executed by a plurality of ones of the cores 2202 at the same or different times. In some examples, the machine code corresponding to the firmware program, the embedded software program, or the software program is split into threads and executed in parallel by two or more of the cores 2202. The software program may correspond to a portion or all of the machine readable instructions and/or operations represented by the flowcharts of FIGS. 17-20.

The cores 2202 may communicate by an example first bus 2204. In some examples, the first bus 2204 may be implemented by a communication bus to effectuate communication associated with one(s) of the cores 2202. For example, the first bus 2204 may be implemented by at least one of an Inter-Integrated Circuit (I2C) bus, a Serial Peripheral Interface (SPI) bus, a PCI bus, or a PCIe bus. Additionally or alternatively, the first bus 2204 may be implemented by any other type of computing or electrical bus. The cores 2202 may obtain data, instructions, and/or signals from one or more external devices by example interface circuitry 2206. The cores 2202 may output data, instructions, and/or signals to the one or more external devices by the interface circuitry 2206. Although the cores 2202 of this example include example local memory 2220 (e.g., Level 1 (L1) cache that may be split into an L1 data cache and an L1 instruction cache), the microprocessor 2200 also includes example shared memory 2210 that may be shared by the cores (e.g., Level 2 (L2 cache)) for high-speed access to data and/or instructions. Data and/or instructions may be transferred (e.g., shared) by writing to and/or reading from the shared memory 2210. The local memory 2220 of each of the cores 2202 and the shared memory 2210 may be part of a hierarchy of storage devices including a plurality of levels of cache memory and the main memory (e.g., the main memory 2114, 2116 of FIG. 21). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2202 may be referred to as a CPU, DSP, GPU, etc., or any other type of hardware circuitry. Each core 2202 includes control unit circuitry 2214, arithmetic and logic (AL) circuitry (sometimes referred to as an ALU) 2216, a plurality of registers 2218, the local memory 2220, and an example second bus 2222. Other structures may be present. For example, each core 2202 may include vector unit circuitry, single instruction multiple data (SIMD) unit circuitry, load/store unit (LSU) circuitry, branch/jump unit circuitry, floating-point unit (FPU) circuitry, etc. The control unit circuitry 2214 includes semiconductor-based circuits structured to control (e.g., coordinate) data movement within the corresponding core 2202. The AL circuitry 2216 includes semiconductor-based circuits structured to perform one or more mathematic and/or logic operations on the data within the corresponding core 2202. The AL circuitry 2216 of some examples performs integer based operations. In other examples, the AL circuitry 2216 also performs floating-point operations. In yet other examples, the AL circuitry 2216 may include first AL circuitry that performs integer-based operations and second AL circuitry that performs floating-point operations. In some examples, the AL circuitry 2216 may be referred to as an Arithmetic Logic Unit (ALU).

The registers 2218 are semiconductor-based structures to store data and/or instructions such as results of one or more of the operations performed by the AL circuitry 2216 of the corresponding core 2202. For example, the registers 2218 may include vector register(s), SIMD register(s), general-purpose register(s), flag register(s), segment register(s), machine-specific register(s), instruction pointer register(s), control register(s), debug register(s), memory management register(s), machine check register(s), etc. The registers 2218 may be arranged in a bank as shown in FIG. 22. Alternatively, the registers 2218 may be organized in any other arrangement, format, or structure, such as by being distributed throughout the core 2202 to shorten access time. The second bus 2222 may be implemented by at least one of an I2C bus, a SPI bus, a PCI bus, or a PCIe bus.

Each core 2202 and/or, more generally, the microprocessor 2200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2200 is a semiconductor device fabricated to include many transistors interconnected to implement the structures described above in one or more integrated circuits (ICs) contained in one or more packages.

The microprocessor 2200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 2200, in the same chip package as the microprocessor 2200 and/or in one or more separate packages from the microprocessor 2200.

Figure 23:
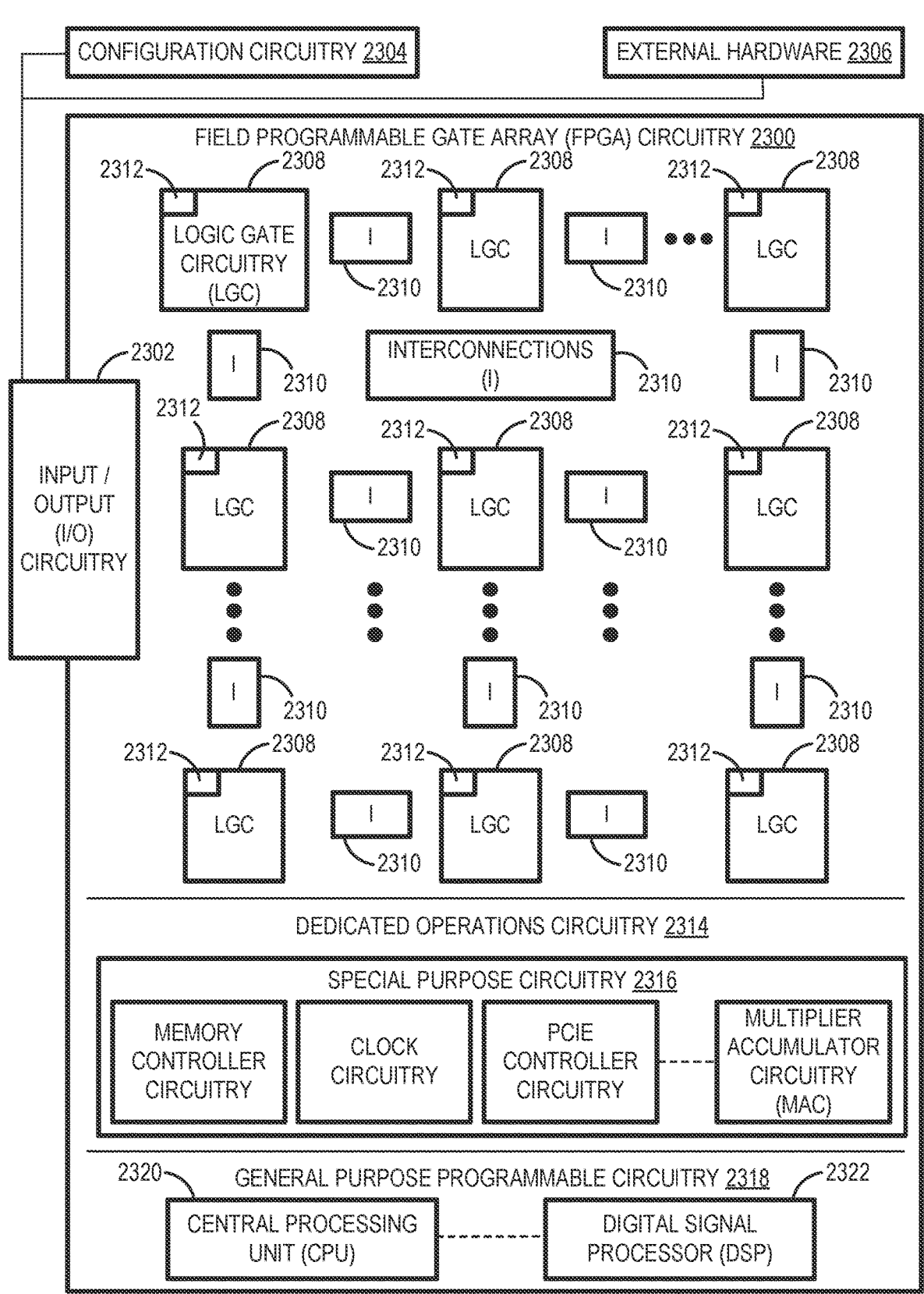
FIG. 23 is a block diagram of another example implementation of the programmable circuitry of FIG. 21.

FIG. 23 is a block diagram of another example implementation of the programmable circuitry 2112 of FIG. 21. In this example, the programmable circuitry 2112 is implemented by FPGA circuitry 2300. For example, the FPGA circuitry 2300 may be implemented by an FPGA. The FPGA circuitry 2300 can be used, for example, to perform operations that could otherwise be performed by the example microprocessor 2200 of FIG. 22 executing corresponding machine readable instructions. However, once configured, the FPGA circuitry 2300 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 2200 of FIG. 22 described above (which is a general purpose device that may be programmed to execute some or all of the machine readable instructions represented by the flowchart(s) of FIGS. 17-20 but whose interconnections and logic circuitry are fixed once fabricated), the FPGA circuitry 2300 of the example of FIG. 23 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 17-20. In particular, the FPGA circuitry 2300 may be thought of as an array of logic gates, interconnections, and switches. The switches can be programmed to change how the logic gates are interconnected by the interconnections, effectively forming one or more dedicated logic circuits (unless and until the FPGA circuitry 2300 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 17-20. As such, the FPGA circuitry 2300 may be configured and/or structured to effectively instantiate some or all of the operations/functions corresponding to the machine readable instructions of the flowchart(s) of FIGS. 17-20 as dedicated logic circuits to perform the operations/functions corresponding to those software instructions in a dedicated manner analogous to an ASIC. Therefore, the FPGA circuitry 2300 may perform the operations/functions corresponding to the some or all of the machine readable instructions of FIGS. 17-20 faster than the general-purpose microprocessor can execute the same.

In the example of FIG. 23, the FPGA circuitry 2300 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2300 of FIG. 23 may access and/or load the binary file to cause the FPGA circuitry 2300 of FIG. 23 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2300 of FIG. 23 to cause configuration and/or structuring of the FPGA circuitry 2300 of FIG. 23, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2300 of FIG. 23 may access and/or load the binary file to cause the FPGA circuitry 2300 of FIG. 23 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2300 of FIG. 23 to cause configuration and/or structuring of the FPGA circuitry 2300 of FIG. 23, or portion(s) thereof.

The FPGA circuitry 2300 of FIG. 23, includes example input/output (I/O) circuitry 2302 to obtain and/or output data to/from example configuration circuitry 2304 and/or external hardware 2306. For example, the configuration circuitry 2304 may be implemented by interface circuitry that may obtain a binary file, which may be implemented by a bit stream, data, and/or machine-readable instructions, to configure the FPGA circuitry 2300, or portion(s) thereof. In some such examples, the configuration circuitry 2304 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2306 may be implemented by external hardware circuitry. For example, the external hardware 2306 may be implemented by the microprocessor 2200 of FIG. 22.

The FPGA circuitry 2300 also includes an array of example logic gate circuitry 2308, a plurality of example configurable interconnections 2310, and example storage circuitry 2312. The logic gate circuitry 2308 and the configurable interconnections 2310 are configurable to instantiate one or more operations/functions that may correspond to at least some of the machine readable instructions of FIGS. 17-20 and/or other desired operations. The logic gate circuitry 2308 shown in FIG. 23 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2308 to enable configuration of the electrical structures and/or the logic gates to form circuits to perform desired operations/functions. The logic gate circuitry 2308 may include other electrical structures such as look-up tables (LUTs), registers (e.g., flip-flops or latches), multiplexers, etc.

The configurable interconnections 2310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2308 to program desired logic circuits.

The storage circuitry 2312 of the illustrated example is structured to store result(s) of the one or more of the operations performed by corresponding logic gates. The storage circuitry 2312 may be implemented by registers or the like. In the illustrated example, the storage circuitry 2312 is distributed amongst the logic gate circuitry 2308 to facilitate access and increase execution speed.

The example FPGA circuitry 2300 of FIG. 23 also includes example dedicated operations circuitry 2314. In this example, the dedicated operations circuitry 2314 includes special purpose circuitry 2316 that may be invoked to implement commonly used functions to avoid the need to program those functions in the field. Examples of such special purpose circuitry 2316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2300 may also include example general purpose programmable circuitry 2318 such as an example CPU 2320 and/or an example DSP 2322. Other general purpose programmable circuitry 2318 may additionally or alternatively be present such as a GPU, an XPU, etc., that can be programmed to perform other operations.

Although FIGS. 22 and 23 illustrate two example implementations of the programmable circuitry 2112 of FIG. 21, many other approaches are contemplated. For example, FPGA circuitry may include an on-board CPU, such as one or more of the example CPU 2320 of FIG. 22. Therefore, the programmable circuitry 2112 of FIG. 21 may additionally be implemented by combining at least the example microprocessor 2200 of FIG. 22 and the example FPGA circuitry 2300 of FIG. 23. In some such hybrid examples, one or more cores 2202 of FIG. 22 may execute a first portion of the machine readable instructions represented by the flowchart(s) of FIGS. 17-20 to perform first operation(s)/function(s), the FPGA circuitry 2300 of FIG. 23 may be configured and/or structured to perform second operation(s)/function(s) corresponding to a second portion of the machine readable instructions represented by the flowcharts of FIG. 17-20, and/or an ASIC may be configured and/or structured to perform third operation(s)/function(s) corresponding to a third portion of the machine readable instructions represented by the flowcharts of FIGS. 17-20.

It should be understood that some or all of the circuitry of FIG. 16 may, thus, be instantiated at the same or different times. For example, same and/or different portion(s) of the microprocessor 2200 of FIG. 22 may be programmed to execute portion(s) of machine-readable instructions at the same and/or different times. In some examples, same and/or different portion(s) of the FPGA circuitry 2300 of FIG. 23 may be configured and/or structured to perform operations/functions corresponding to portion(s) of machine-readable instructions at the same and/or different times.

In some examples, some or all of the circuitry of FIG. 16 may be instantiated, for example, in one or more threads executing concurrently and/or in series. For example, the microprocessor 2200 of FIG. 22 may execute machine readable instructions in one or more threads executing concurrently and/or in series. In some examples, the FPGA circuitry 2300 of FIG. 23 may be configured and/or structured to carry out operations/functions concurrently and/or in series. Moreover, in some examples, some or all of the circuitry of FIG. 16 may be implemented within one or more virtual machines and/or containers executing on the microprocessor 2200 of FIG. 22.

In some examples, the programmable circuitry 2112 of FIG. 21 may be in one or more packages. For example, the microprocessor 2200 of FIG. 22 and/or the FPGA circuitry 2300 of FIG. 23 may be in one or more packages. In some examples, an XPU may be implemented by the programmable circuitry 2112 of FIG. 21, which may be in one or more packages. For example, the XPU may include a CPU (e.g., the microprocessor 2200 of FIG. 22, the CPU 2320 of FIG. 23, etc.) in one package, a DSP (e.g., the DSP 2322 of FIG. 23) in another package, a GPU in yet another package, and an FPGA (e.g., the FPGA circuitry 2300 of FIG. 23) in still yet another package.

Example methods, apparatus, systems, and articles of manufacture to enable effective determination of an engine operating status are disclosed herein. Further examples and combinations thereof include the following:

Example 1 includes an apparatus for use with a gas turbine engine having bleed offtakes, the apparatus comprising at least one sensor positioned on or within the gas turbine engine, the at least one sensor to measure at least one parameter corresponding to a first plenum within a casing of the gas turbine engine, the first plenum positioned at or downstream of a volume at which flows from respective ones of the bleed offtakes are combined, and a second plenum within the casing, the second plenum positioned upstream of the first plenum, and an interface to communicatively couple the at least one sensor to a controller, the controller to determine a status of the bleed offtakes based on the at least one parameter.

Example 2 includes the apparatus of any proceeding clause, wherein the second plenum is positioned at a cavity that supplies the bleed offtakes with respective flows.

Example 3 includes the apparatus of any proceeding clause, wherein the second plenum is positioned adjacent the first plenum.

Example 4 includes the apparatus of any proceeding clause, wherein an orifice is disposed between the first and second plenums.

Example 5 includes the apparatus of any proceeding clause, further including an annular seal that defines the orifice.

Example 6 includes the apparatus of any proceeding clause, wherein the annular seal is a bulkhead seal corresponding to a turbine of the gas turbine engine.

Example 7 includes the apparatus of any proceeding clause, wherein the orifice is positioned on an inducer adjacent the first plenum.

Example 8 includes the apparatus of any proceeding clause, further including a tube extending from the first plenum or the second plenum to the at least one sensor positioned at or proximate an outer surface of the casing.

Example 9 includes the apparatus of any proceeding clause, wherein the at least one sensor is to measure a temperature of the first plenum or the second plenum.

Example 10 includes the apparatus of any proceeding clause, wherein the controller is to determine the status with regard to an occurrence of ingestion in the gas turbine engine based on the measured temperature.

Example 11 includes the apparatus of any proceeding clause, wherein the at least one sensor is to measure at least one a pressure or a pressure differential corresponding to the first plenum and the second plenum.

Example 12 includes the apparatus of any proceeding clause, wherein at least one of the first or second plenums is located at a turbine center frame hub box, a high pressure compressor offtake plenum, a hub box, a low pressure turbine purge cavity, a high pressure turbine shroud, a high pressure turbine hangar, a purge cavity or an inducer.

Example 13 includes a gas turbine engine comprising a casing at least partially defining a body of the gas turbine engine, bleed offtakes extending from the body, the bleed offtakes to separate flow from a combined volume and provide the flow downstream of the combined volume to a recombined volume, at least one sensor disposed within the casing or fluidly coupled to an internal volume of the casing, the at least one sensor to provide sensor output by measuring at least one of a temperature, a pressure or a differential pressure corresponding to (i) a first position downstream of or at the recombined volume and (ii) a second position upstream from the first position, and a controller to determine a health status of the gas turbine engine based on output from the at least one sensor.

Example 14 includes the gas turbine engine of any proceeding clause, wherein the first position corresponds to a first plenum and the second position corresponds to a second plenum.

Example 15 includes the gas turbine engine of any proceeding clause, wherein the second plenum is at least partially defined by an inducer of the gas turbine engine.

Example 16 includes the gas turbine engine of any proceeding clause, wherein the first plenum is adjacent to the second plenum with an orifice separating the first plenum from the second plenum.

Example 17 includes the gas turbine engine of any proceeding clause, wherein the orifice is defined by an inducer.

Example 18 includes the gas turbine engine of any proceeding clause, wherein the at least one sensor is to measure a first temperature of engine coolant and a second temperature of a turbine, and wherein the controller is to determine a presence of ingestion of the gas turbine engine based on the first and second temperatures.

Example 19 includes the gas turbine engine of any proceeding clause, further including a seal, housing, inducer or frame that defines an orifice between a first plenum at the first position and a second plenum at the second position.

Example 20 includes the gas turbine engine of any proceeding clause, further including a tube that fluidly couples the at least one sensor to at least one of a first plenum at the first position or a second plenum at the second position.

Example 21 includes an apparatus comprising interface circuitry, and programmable circuitry to at least one of instantiate or execute machine readable instructions to determine, based on output from at least one sensor, at least one parameter corresponding to (i) a first plenum in a casing of a gas turbine engine, the first plenum positioned at or downstream of a volume at which flows from respective ones of bleed offtakes of the gas turbine engine are combined, and (ii) a second plenum in the casing, the second plenum positioned upstream of the first plenum, determine a status of at least one of the bleed offtakes or the at least one sensor based on the at least one parameter, and provide or indicate a notification of the status in response to the status indicating improper operation of at least one of the bleed offtakes or the at least one sensor.

Example 22 includes the apparatus of any proceeding clause, wherein the programmable circuitry is to at least one of instantiate or execute the machine readable instructions to cause the notification with a service alert to be transmitted based on the status indicating the improper operation of at least one of the bleed offtakes or the at least one sensor.

Example 23 includes the apparatus of any proceeding clause, wherein the programmable circuitry is to at least one of instantiate or execute the machine readable instructions to compare the at least one parameter to at least one threshold to determine the status.

Example 24 includes the apparatus of any proceeding clause, wherein first, second and third parameters are measured by the at least one sensor with respect to the first plenum or the second plenum, and wherein the programmable circuitry is to at least one of instantiate or execute the machine readable instructions to disregard at least one of first, second and third parameters when the at least one of first, second and third parameters exceeds a difference threshold with respect to an average of the first, second and third parameters.

Example 25 includes the apparatus of any proceeding clause, wherein the programmable circuitry is to at least one of instantiate or execute the machine readable instructions to average ones of the first, second and third parameters that are not disregarded.

Example 26 includes the apparatus of any proceeding clause, wherein the programmable circuitry is to at least one of instantiate or execute the machine readable instructions to determine a presence of ingestion in the gas turbine engine based on the averaged ones of the first, second and third parameters that are not disregarded.

Example 27 includes the apparatus of any proceeding clause, wherein first and second parameters are measured by the at least one sensor at the first plenum or the second plenum, respectively, and wherein the programmable circuitry is to at least one of instantiate or execute the machine readable instructions to compare at least one of the first or second parameters to output of at least one model to determine the status of the gas turbine engine.

Example 28 includes the apparatus of any proceeding clause, wherein first and second parameters are measured by the at least one sensor at the first plenum or the second plenum, respectively, and wherein the programmable circuitry is to at least one of instantiate or execute the machine readable instructions to apply a first weight to the first parameter to define a weighted first parameter and apply a second weight to the second parameter to define a weighted second parameter, and wherein the determination of the status is based on the first and second weighted parameters.

Example 29 includes the apparatus of any proceeding clause, wherein the programmable circuitry is to at least one of instantiate or execute the machine readable instructions to determine a weighted average of the first and second weighted parameters based on the first and second weighted parameters for determination of the status.

Example 30 includes the apparatus of any proceeding clause, wherein the programmable circuitry is to at least one of instantiate or execute the machine readable instructions to cause the gas turbine engine to operate at a reduced performance based on the status indicating the improper operation of at least one of the bleed offtakes or the at least one sensor.

Example 31 includes a non-transitory machine readable storage medium comprising instructions to cause programmable circuitry to at least determine, based on output from at least one sensor, (i) a first parameter corresponding to a first position in a casing of a gas turbine engine, the first position at or downstream of a volume at which flows from respective ones of bleed offtakes are combined, and (ii) a second parameter corresponding to a second position in the casing of the gas turbine engine, the second position upstream from the first position, determine a status of at least one of the bleed offtakes or the at least one sensor based on the first and second parameters, and provide or indicate the status in response to the status indicating improper operation of at least one of the bleed offtakes or the at least one sensor.

Example 32 includes the machine readable storage medium of any proceeding clause, wherein the instructions cause the programmable circuitry to determine third and fourth parameters measured by the at least one sensor at the first position or the second position.

Example 33 includes the machine readable storage medium of any proceeding clause, wherein the third and fourth parameters correspond to the first position, and wherein the instructions cause the programmable circuitry to disregard at least one of the first, third and fourth parameters based on difference thresholds of the first, third and fourth parameters with respect to an average of the first, third and fourth parameters.

Example 34 includes the machine readable storage medium of any proceeding clause, wherein the third and fourth parameters correspond to the second position, and wherein the instructions cause the programmable circuitry to disregard at least one of the second, third and fourth parameters based on difference thresholds of the second, third and fourth parameters with respect to an average of the second, third and fourth parameters.

Example 35 includes the machine readable storage medium of any proceeding clause, wherein the second, third and fourth parameters correspond to temperatures of the second position, and wherein the instructions cause the programmable circuitry to determine a presence of ingestion in the gas turbine engine based on the temperatures of the second position, the status further indicating the presence of the ingestion.

Example 36 includes the machine readable storage medium of any proceeding clause, wherein the instructions cause the programmable circuitry to determine the status of the at least one bleed offtake of the gas turbine engine based on a comparison of the first and second parameters.

Example 37 includes the machine readable storage medium of any proceeding clause, wherein the instructions cause the programmable circuitry to apply a first weight to the first parameter to define a weighted first parameter and a second weight to the second parameter to define a weighted second parameter, and wherein the determination of the status is based on summing the first and second weighted parameters.

Example 38 includes a method comprising determining, by executing instructions with processor circuitry, first and second parameters measured by at least one sensor, the first parameter corresponding to a first position in a casing of a gas turbine engine, the first position downstream of or at a volume at which flows from respective ones of bleed offtakes of the gas turbine engine are combined, and the second parameter corresponding to a second position in the casing upstream of the first position, determining, by executing instructions with the processor circuitry, a status of at least one of the bleed offtakes or the at least one sensor based on the first and second parameters, and providing or indicating, by executing instructions with the processor circuitry, a notification of the status in response to the status indicating improper operation of at least one of the bleed offtakes or the at least one sensor.

Example 39 includes the method of any proceeding clause, wherein the determining the first and second parameters includes measuring at least one of a pressure, temperature or a pressure differential corresponding to a first plenum at the first position and a second plenum at the second position.

Example 40 includes the method of any proceeding clause, further including determining, by executing instructions with the processor circuitry, a presence of ingestion in the gas turbine engine.

From the foregoing, it will be appreciated that example systems, apparatus, articles of manufacture, and methods have been disclosed that enable an accurate and cost-effective determination of a status of an engine, including a status of bleed offtakes, a presence of ingestion, etc. Examples disclosed herein can reduce costs, weight and downtime of gas turbine engines by reducing a number of sensors typically utilized for monitoring bleed offtake pipes, and analyzing sensor data even when one of the sensors is experiencing a malfunction and/or incorrect operation. Further, examples disclosed herein can effectively determine if a sensor can be ignored during abnormal operation and, thus, enable increased accuracy even during a malfunction or incorrect operation of the sensor.

Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus for use with a gas turbine engine having bleed offtakes, the apparatus comprising:

at least one sensor positioned on or within the gas turbine engine, the at least one sensor to measure at least one parameter corresponding to:

a first plenum within a casing of the gas turbine engine, the first plenum positioned at or downstream of a volume at which flows from respective ones of the bleed offtakes are combined, and a second plenum within the casing, the second plenum positioned upstream of the first plenum and at a cavity that supplies the bleed offtakes with respective flows; and an interface to communicatively couple the at least one sensor to a controller, the controller to determine a status of the bleed offtakes based on the at least one parameter, wherein the at least one parameter comprises a pressure differential corresponding to the first plenum and the second plenum.

2. The apparatus as defined in claim 1, wherein the second plenum is positioned adjacent the first plenum.

3. The apparatus as defined in claim 1, wherein an orifice is disposed between the first and second plenums.

4. The apparatus as defined in claim 3, further including an annular seal that defines the orifice.

5. The apparatus as defined in claim 4, wherein the annular seal is a bulkhead seal corresponding to a turbine of the gas turbine engine.

6. The apparatus as defined in claim 3, wherein the orifice is positioned on an inducer adjacent the first plenum.

7. The apparatus as defined in claim 1, further including a tube extending from the first plenum or the second plenum to the at least one sensor positioned at or proximate an outer surface of the casing.

8. The apparatus as defined in claim 1, wherein the at least one sensor is to measure a temperature of the first plenum or the second plenum.

9. The apparatus as defined in claim 8, wherein the interface is to provide the controller with the at least one parameter to determine the status with regard to an occurrence of ingestion in the gas turbine engine based on the measured temperature.

10. The apparatus as defined in claim 1, wherein at least one of the first or second plenums is located at a turbine center frame hub box, a high pressure compressor offtake plenum, a hub box, a low pressure turbine purge cavity, a high pressure turbine shroud, a high pressure turbine hangar, a purge cavity or an inducer.

11. A gas turbine engine comprising:

a casing at least partially defining a body of the gas turbine engine;

bleed offtakes extending from the body, the bleed offtakes to separate flow from a combined volume and provide the flow downstream of the combined volume to a recombined volume;

at least one sensor disposed within the casing or fluidly coupled to an internal volume of the casing, the at least one sensor to provide sensor output by measuring at least one parameter corresponding to (i) a first plenum positioned at a first position downstream of or at the recombined volume and (ii) a second plenum positioned at a second position upstream from the first position, the second position corresponding to where the flow is provided to inlets of the bleed offtakes; and a controller to determine a health status of the gas turbine engine based on output from the at least one sensor, wherein the at least one parameter comprises a pressure differential corresponding to the first plenum and the second plenum.

12. The gas turbine engine as defined in claim 11, wherein the second plenum is at least partially defined by an inducer of the gas turbine engine.

13. The gas turbine engine as defined in claim 11, wherein the first plenum is adjacent to the second plenum with an orifice separating the first plenum from the second plenum.

14. The gas turbine engine as defined in claim 13, wherein the orifice is defined by an inducer.

15. The gas turbine engine as defined in claim 11, wherein the at least one sensor is to measure a first temperature of engine coolant and a second temperature of a turbine, and wherein the controller is to determine a presence of ingestion of the gas turbine engine based on the first and second temperatures.

16. The gas turbine engine as defined in claim 11, further including a seal, housing, inducer or frame that defines an orifice between a first plenum at the first position and a second plenum at the second position.

17. The gas turbine engine as defined in claim 11, further including a tube that fluidly couples the at least one sensor to at least one of a first plenum at the first position or a second plenum at the second position.

\* \* \* \* \*